US007373059B2

(12) United States Patent
Spillane et al.

(10) Patent No.: US 7,373,059 B2
(45) Date of Patent: May 13, 2008

(54) COMPACT, SINGLE CHIP-BASED, ENTANGLED POLARIZATION-STATE PHOTON SOURCES AND METHODS FOR GENERATING PHOTONS IN ENTANGLED POLARIZATION STATES

(75) Inventors: Sean Spillane, Mountain View, CA (US); Marco Florentino, Mountain View, CA (US); Charles Santori, Sunnyvale, CA (US); Raymond G. Beausoleil, Jr., Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 53 days.

(21) Appl. No.: 11/525,717

(22) Filed: Sep. 22, 2006

(65) Prior Publication Data

US 2008/0075410 A1 Mar. 27, 2008

(51) Int. Cl.
*G02B 6/00* (2006.01)

(52) U.S. Cl. ...................... 385/122; 385/129; 385/147; 250/216; 250/225; 372/43.01

(58) Field of Classification Search ................ 385/122, 385/129-132, 147; 250/216, 225; 372/43.01
See application file for complete search history.

(56) References Cited

U.S. PATENT DOCUMENTS 5,596,667 A * 1/1997 Watanabe .................. 385/122
2006/0163465 A1* 7/2006 Kuzmich et al. ........... 250/251

* cited by examiner

*Primary Examiner*—Frank G. Font
*Assistant Examiner*—Derek L. Dupuis

(57) ABSTRACT

Various embodiments of the present invention are directed to compact systems for generating polarization-entangled photons. In one embodiment of the present invention, a polarization entangled-photon state source comprises a single transmission layer configured for transmitting electromagnetic radiation. The transmission layer includes a beamsplitter and a down-conversion device, both of which are configured to convert a pump beam into first and second signal beams and first and second idler beams. The transmission layer also includes a mode converter configured to invert electric and magnetic field components of both the first signal beam and the first idler beam, and a combiner configured to receive the first and second signal beams and the first and second idler beams and output the first and second signal beams and the first and second idler beams in an entangled polarization states.

20 Claims, 18 Drawing Sheets

COMPACT, SINGLE CHIP-BASED, ENTANGLED POLARIZATION-STATE PHOTON SOURCES AND METHODS FOR GENERATING PHOTONS IN ENTANGLED POLARIZATION STATES

TECHNICAL FIELD

Device and method embodiments of the present invention relate to nonlinear optical devices, and in particular, to compact, nonlinear-optics-based devices for generating photons in polarization-entangled states.

BACKGROUND OF THE INVENTION

Recent and promising advancements in fields ranging from materials science to quantum physics are now being used to produce new quantum-system-based technologies. These quantum systems can be used to encode and transmit quantum information. In particular, quantum systems comprising just two discrete states, represented by "$|0\rangle$" and "$|1\rangle$," can potentially be employed in a variety of quantum-system-based applications including quantum information encoding and processing, optical quantum lithography, and metrology. A quantum system comprising two discrete states is called a "qubit system," and the states $|0\rangle$ and $|1\rangle$, called "qubit basis states," can also be represented in set notation as $\{|0\rangle, |1\rangle\}$. A qubit system can exist in the state $|0\rangle$, the state $|1\rangle$, or in any of an infinite number of states that simultaneously comprise both $|0\rangle$ and $|1\rangle$, which can be mathematically represented by a linear superposition of states as follows:

$$|\psi\rangle = \alpha|0\rangle + \beta|1\rangle$$

The state $|\psi\rangle$ is called a "qubit," and the parameters $\alpha$ and $\beta$ are complex-valued coefficients satisfying the condition:

$$|\alpha|^2 + |\beta|^2 = 1$$

Performing a measurement on a quantum system is mathematically equivalent to projecting the state of the quantum system onto one of the basis states, and, in general, the probability of projecting the state of the quantum system onto a basis state is equal to the square of the coefficient associated with the basis state. For example, when the state $|\psi\rangle$ of the qubit system is measured in the basis $\{|0\rangle,|1\rangle\}$, one has a probability $|\alpha|^2$ of finding the quantum system in the state $|0\rangle$ and a probability $|\beta|^2$ of finding the quantum system in the state $|1\rangle$.

The infinite number of pure states associated with a qubit system can be geometrically represented by a unit-radius, three-dimensional sphere called a "Bloch sphere":

$$|\psi\rangle = \cos\left(\frac{\theta}{2}\right)|0\rangle + e^{i\phi}\sin\left(\frac{\theta}{2}\right)|1\rangle$$

where $0 \leqq \theta < \pi$, and $0 \leqq \phi < 2\pi$.

FIG. 1A illustrates a Bloch sphere representation of a qubit system. In FIG. 1A, lines 101-103 are orthogonal x, y, and z Cartesian coordinate axes, respectively, and a Bloch sphere 106 is centered at the origin. There are an infinite number of points on the Bloch sphere 106, each point representing a unique state of a qubit system. For example, a point 108 on the Bloch sphere 106 represents a unique state of a qubit system that simultaneously comprises, in part, the state $|0\rangle$ and, in part, the state $|1\rangle$. However, once the state of the qubit system is measured in the basis $\{|0\rangle,|1\rangle\}$, the state of the qubit system is projected onto the state $|0\rangle$ 110 or onto the state $|1\rangle$ 112.

Photon states of electromagnetic radiation can be used as qubit basis states in quantum information processing and quantum computing applications. The term "photon" refers to a single quantum of excitation energy of an electromagnetic field mode of electromagnetic radiation. The electromagnetic radiation can be in the form of propagating electromagnetic waves, each electromagnetic wave comprising both a transverse electric field component, $\vec{E}$, and an orthogonal transverse magnetic field component, $\vec{B}$. FIG. 1B illustrates the transverse electric and magnetic field components of an electromagnetic wave propagating in the direction, $\vec{k}$. As shown in FIG. 1B, the electromagnetic wave is directed along the z-axis 120. The transverse electric field ("TE") component $\vec{E}$ 122 and the transverse magnetic field ("TM") component $\vec{B}$ 124 are directed along the orthogonal x- and y-axes 126 and 128, respectively. Although the TE and TM are shown in FIG. 1B to have identical amplitudes, in real life the amplitude of the TM component is smaller than the amplitude of the TE component by a factor of 1/c, where c represents the speed of light in free space ($c=3.0\times10^8$ m/sec). Because of the large discrepancy in the magnitude of the electric field component and the magnitude of the magnetic field component, the electric field component alone accounts for most of the electromagnetic wave interactions with matter.

Polarized photon states of electromagnetic waves can also be used as qubit basis states in quantum information processing and quantum computing. Two commonly used basis states are vertically and horizontally polarized photons of electromagnetic waves. FIGS. 2A-2B illustrates vertically and horizontally polarized photons, respectively. In FIGS. 2A-2B, vertically and horizontally polarized photons are represented by oscillating continuous sinusoidal waves that represent the electric field components propagating along z-coordinate axes 202 and 204, respectively. As shown in FIG. 2A, a vertically polarized photon $|V\rangle$ corresponds to an electric field component that oscillates in the yz-plane. Directional arrow 206 represents one complete oscillatory cycle of the electric field component of $|V\rangle$ in the xy-plane 208 as $|V\rangle$ advances along the z-coordinate axis 202 through one complete wavelength. In FIG. 2B, a horizontally polarized photon $|H\rangle$ corresponds to an electric field component that oscillates in the xz-plane. Directional arrow 210 represents one complete oscillatory cycle of the electric field component of $|H\rangle$ in the xy-plane 212 as $|H\rangle$ advances along the z-coordinate axis 204 through one complete wavelength.

The state of a system comprising two or more qubit systems is represented by a tensor product of qubits, each qubit associated with one of the qubit systems. For example, the tensor product of a system comprising a first qubit system and a second qubit system is given by:

$$|\psi\rangle_{12} = |\psi\rangle_1 |\psi\rangle_2$$

where the state of the first qubit system is:

$$|\psi\rangle_1 = \frac{1}{\sqrt{2}}(|0\rangle_1 + |1\rangle_1)$$

and the state of the second qubit system is:

$$|\psi\rangle_2 = \frac{1}{\sqrt{2}}(|0\rangle_2 + |1\rangle_2)$$

The state $|\psi\rangle_{12}$ can also be rewritten as a linear superposition of products of basis states:

$$|\psi\rangle_{12} = |\psi\rangle_1|\psi\rangle_2 = \frac{1}{2}(|0\rangle_1|0\rangle_2 + |0\rangle_1|1\rangle_2 + |1\rangle_1|0\rangle_2 + |1\rangle_1|1\rangle_2)$$

where the terms $|0\rangle_1|0\rangle_2$, $|0\rangle_1|1\rangle_2$, $|1\rangle_1|0\rangle_2$, and $|1\rangle_1|1\rangle_2$ are a basis of the tensor product space. Each product state in the state $|\psi\rangle_{12}$ has an associated coefficient of 1/2, which indicates that when the state of the first qubit system is measured in the bases $\{|0\rangle_1,|1\rangle_1\}$, and the state of the second qubit system is measured in the basis $\{|0\rangle_2,|1\rangle_2\}$, there is a 1/4 ($|1/2|^2$) probability of the combined qubit systems being found in any one of the product states.

Certain states of the combined qubit systems, however, cannot be represented by a product of associated qubits. These qubit systems are said to be "entangled." Quantum entanglement is a unique property of quantum mechanics in which the states of two or more quantum systems are correlated, even though the quantum systems can be spatially separated. An example entangled-state representation of an entangled two-qubit system is given by:

$$|\psi^+\rangle_{12} = \frac{1}{\sqrt{2}}(|0\rangle_1|1\rangle_2 + |1\rangle_1|0\rangle_2)$$

The entangled state $|\psi^+\rangle_{12}$ cannot be factored into a product of the qubits $\alpha_1|0\rangle_1+\beta_1|1\rangle_1$ and $\alpha_2|0\rangle_2+\beta_2|1\rangle_2$, for any choice of the parameters $\alpha_1$, $\beta_1$, $\alpha_2$, and $\beta_2$.

The state of an un-entangled, two-qubit system can be distinguished from the state of an entangled, two-qubit system as follows. Consider an un-entangled, two-qubit system in the state $|\psi\rangle_{12}$. Suppose a measurement performed on the first qubit system in the basis $\{|0\rangle_1,|1\rangle_1\}$ projects the state of the first qubit system onto the state $|0>_1$. According to the state $|\psi\rangle_{12}$, the state of the un-entangled, two-qubit system immediately after the measurement is the linear superposition of states $(|0\rangle_1|0\rangle_2+|0\rangle_1|1\rangle_2)/\sqrt{2}$. When a second measurement is performed on the second qubit system in the basis $\{|0\rangle_2,|1\rangle_2\}$ immediately following the first measurement in an identical reference frame, there is a 1/2 probability of projecting the state of the second qubit system onto the state $|0\rangle_2$ and a 1/2 probability of projecting the state of the second qubit system onto the state $|1\rangle_2$. In other words, the state of the second qubit system is not correlated with the state of the first qubit system.

In contrast, consider an entangled, two-qubit system in the entangled state $|\psi^+\rangle_{12}$. Suppose that a first measurement performed on the first qubit system in the basis $\{|0\rangle_1,|1\rangle_1\}$ also projects the state of the first qubit system onto the state $|0\rangle_1$. According to the entangled state $|\psi^+\rangle_{12}$, the state of the entangled, two-qubit system after the first measurement is the product state $|0\rangle_1|1\rangle_2$. When a second measurement is performed on the second qubit system in the basis $\{|0\rangle_2,|1\rangle_2\}$, the state of the second qubit system is $|1\rangle_2$ with certainty. In other words, the state of the first qubit system is correlated with the state of the second qubit system.

Entangled quantum systems have a number of different and practical applications in fields ranging from quantum computing to quantum information processing. In particular, the polarization entangled-photons described above can be used in quantum information processing, quantum cryptography, teleportation, and linear optics quantum computing. Examples of polarization entangled-photons that can be used in a number of different entangled-state applications are the Bell states given by:

$$|\psi^-\rangle = \frac{1}{\sqrt{2}}(|H\rangle_1|V\rangle_2 - |V\rangle_1|H\rangle_2),$$

$$|\psi^+\rangle = \frac{1}{\sqrt{2}}(|H\rangle_1|V\rangle_2 + |V\rangle_1|H\rangle_2),$$

$$|\phi^-\rangle = \frac{1}{\sqrt{2}}(|V\rangle_1|V\rangle_2 - |H\rangle_1|H\rangle_2), \text{ and}$$

$$|\phi^+\rangle = \frac{1}{\sqrt{2}}(|V\rangle_1|V\rangle_2 + |H\rangle_1|H\rangle_2)$$

where the subscripts "1" and "2" can represent different transmission channels or different wavelengths.

Although polarization-entangled photons have a number of potentially useful applications, polarization-entangled photon sources typically cannot be practically implemented in a wide variety of entangled state applications. For example, in "New High-Intensity Source of Polarization-Entangled Photon Pairs," by Kwiat et al. *Physical Review Letters*, vol. 75, 4337, (1995), Kwiat describes a high-intensity source of polarization entangled-photon Bell states that works for continuous electromagnetic waves but not for electromagnetic wave pulses. In addition, only photons emitted in a particular direction are entangled. As a result, only a limited number of Bell states can be generated. In "Ultrabright source of polarization-entangled photons," by Kwiat et al., *Physical Review A*, vol. 60, R773, (1999), Kwiat also describes a source of polarization-entangle photon pairs. However, thin crystals and continuous wave pumps have to be used in order to obtain good entanglement. In "Phase-stable source of polarization-entangled photons using a polarization Sagnac interferometer," by Taehyun Kim et al., *Physical Review A*, vol. 73, 012316 (2006) and in "Generation of ultrabright tunable polarization entanglement without spatial, spectral, or temporal constraints," by Fiorentino et al., *Physical Review A*, vol. 69, 041801(R) (2004), both Kim and Fiorentino describe an ultrabright parametric down-conversion source of Bell state polarization-entangled photons. However, these polarization-entangled photon sources cannot be used in microscale applications, are expensive to produce, and need periodic adjustments. Physicists, computer scientists, and entangled state users have recognized a need for polarization entangled-photon sources that are compatible with both continuous wave and pulse pump sources and can be coupled to fiber optic couplers for implementation in microscale devices.

SUMMARY OF THE INVENTION

Various embodiments of the present invention are directed to compact, single-chip-based systems for generating polarization-entangled photons. In one embodiment of the present invention, a polarization entangled-photon state source comprises a single transmission layer configured for transmitting electromagnetic radiation. The transmission layer includes a beamsplitter configured to receive a pump beam and output a first pump beam and a second pump beam, and a down-conversion device configured to receive the first pump beam and output both a first signal beam and a first idler beam and receive the second pump beam and output a second signal beam and a second idler beam. The transmission layer also includes a mode converter configured to convert electric field components of both the first signal beam and the first idler beam into magnetic field components and convert magnetic field components of both the first signal beam and the first idler beam into electric field components. A combiner, embedded in the transmission layer, is configured to receive the first and second signal beams and the first and second idler beams and output the first and second signal beams and the first and second idler beams in an entangled state.

DETAILED DESCRIPTION OF THE INVENTION

Various embodiments of the present invention are directed to compact, single-chip-based systems for generating polarization-entangled photons. In particular, certain system embodiments of the present invention can be used to generate polarization-entangled photons in the Bell states. In order to assist the reader in understanding descriptions of various embodiments of the present invention, an overview of TE/TM mode converters, beam combiners, beam splitters, and spontaneous parametric down conversion are provided in a first subsection. Various system embodiments of the present invention are provided in a second subsection.

TE/TM Mode Converters, Beam Combiners Beams Splitters, and Spontaneous Parametric Down Conversion A TE/TM mode converter converts an incident vertically polarized electromagnetic wave into a horizontally polarized electromagnetic wave, and converts an incident horizontally polarized electromagnetic wave into a vertically polarized electromagnetic wave. The mode conversion process is often represented by:

$$TM \leftrightarrows TE$$

Figure 1A:
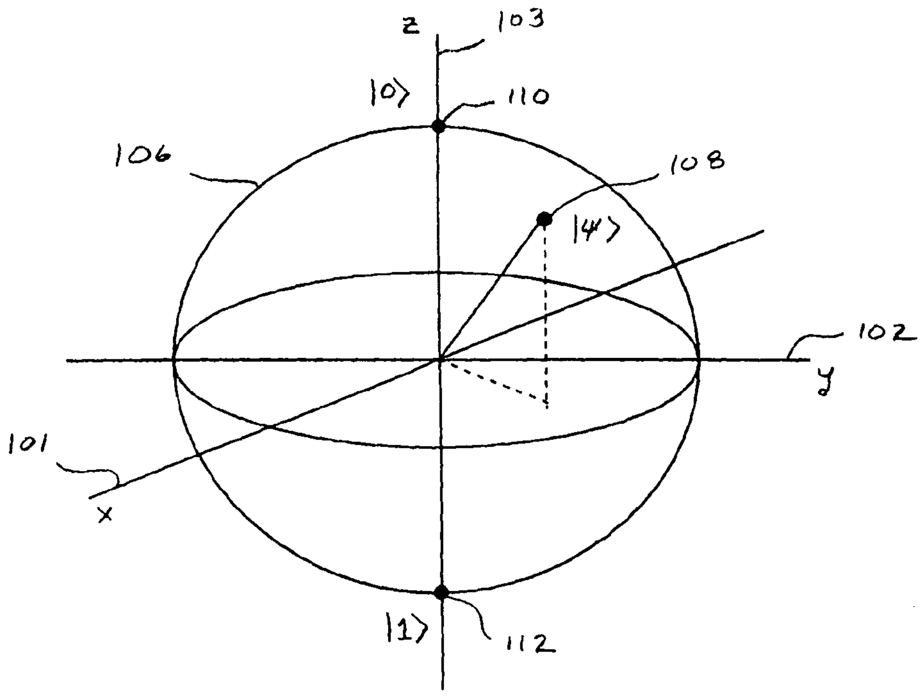
FIG. 1A illustrate a Bloch sphere representation of a qubit system.
Figure 1B:
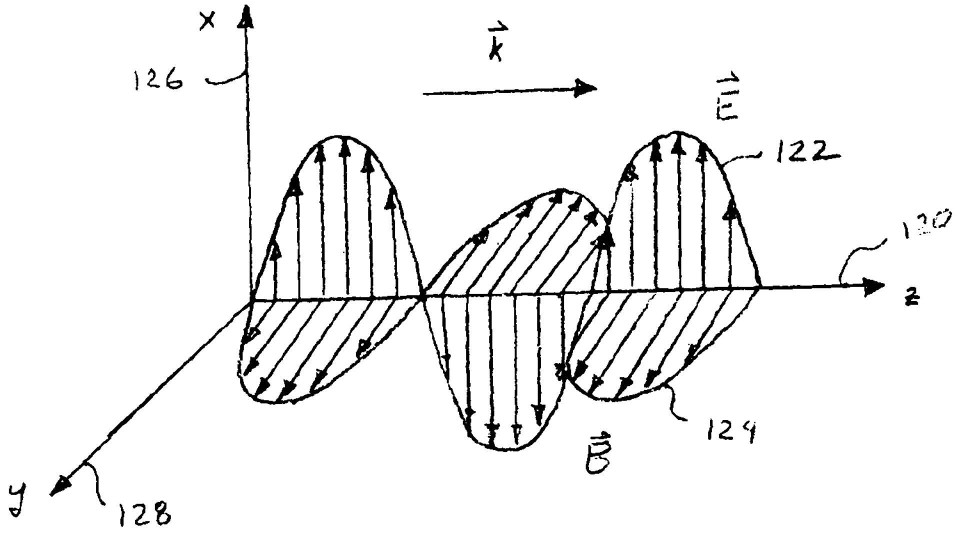
FIG. 1B illustrates transverse electric field and transverse magnetic field components of a propagating electromagnetic wave.
Figure 2A:
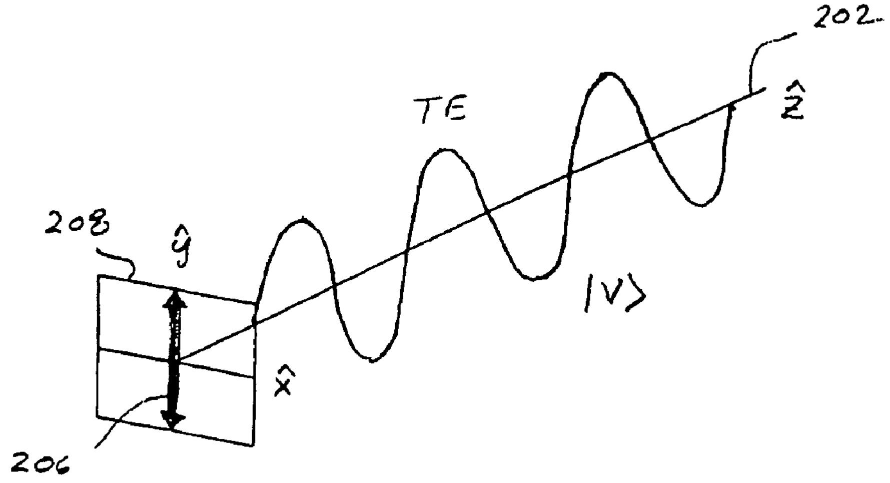
FIGS. 2A-2B illustrates vertically and horizontally polarized photon basis states.
Figure 2B:
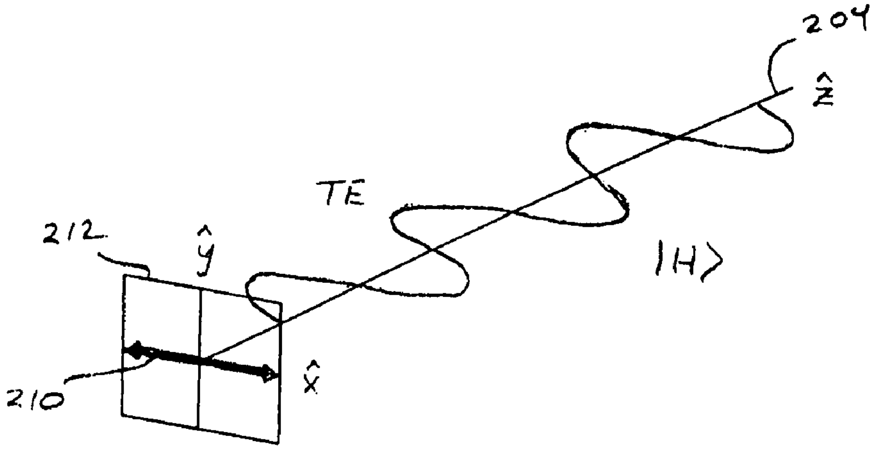
Figure 3A:
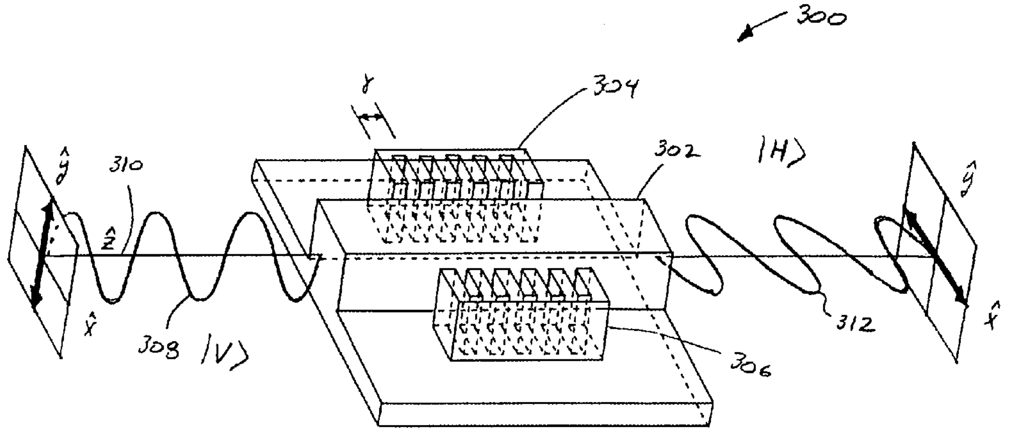
FIGS. 3A-3B illustrate polarization state changes resulting from an electric-field/magnetic-field mode converter.
Figure 3B:
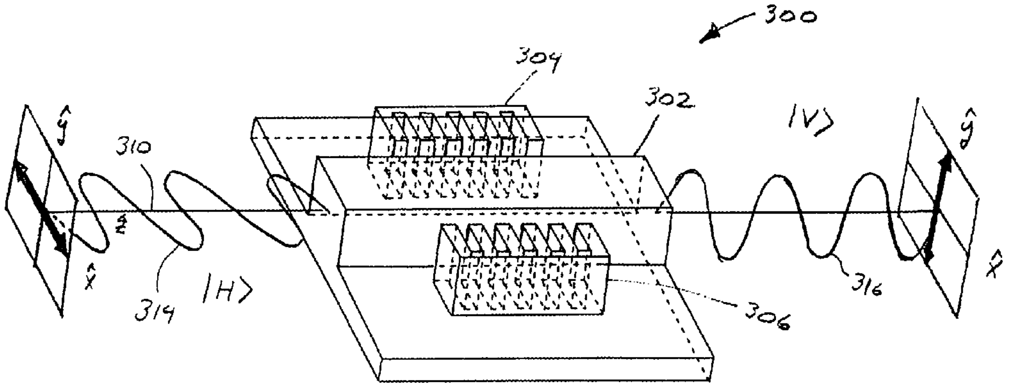

FIGS. 3A-3B illustrate polarization state changes of vertically and horizontally polarized electromagnetic waves incident upon a ridge waveguide TE/TM mode converter 300. The TE/TM mode converter comprises a waveguide 302 sandwiched between a first periodic electrode 304 and a second periodic electrode 306, both with a period of $\gamma$. The electrodes 304 and 306 supply a voltage across the waveguide 302 that switches the TE and TM of an electromagnetic wave propagating in the waveguide 302. In FIG. 3A, a vertically polarized photon $|V\rangle$ 308 propagates along a z-coordinate axis 310 in the waveguide 302. As the vertically polarized photon $|V\rangle$ 308 passes between the electrodes 304 and 306, the associated TE and TM modes are switched so that a horizontally polarized photon |H⟩ 312 emerges from the opposite side of the TE/TM mode converter 300. In FIG. 3B, a horizontally polarized photon |H⟩ 314 propagates along the z-coordinate axis 310 to the front side of the TE/TM mode converter 300. As the horizontally polarized photon |H⟩ 314 passes through the waveguide 302, a vertically polarized photon |V⟩ 316 emerges from the opposite side of the TE/TM mode converter 300. Electrooptic TE/TM mode converters are well-known in the art. See e.g., "Efficient waveguide electro-optic TM⇆TE mode converter/waveguide filter," by R. C. Alferness, *Appl. Phys. Lett.* 36(7), 1 Apr. 1980, and "Integrated waveguide modulator using a $LiNbO_3$ TM⇆TE converter for electrooptic coherence modulation of light," by H. Porte et al., *J. Lightwave Technology, vol.* 6, no. 6, June 1988.

Figure 4A:
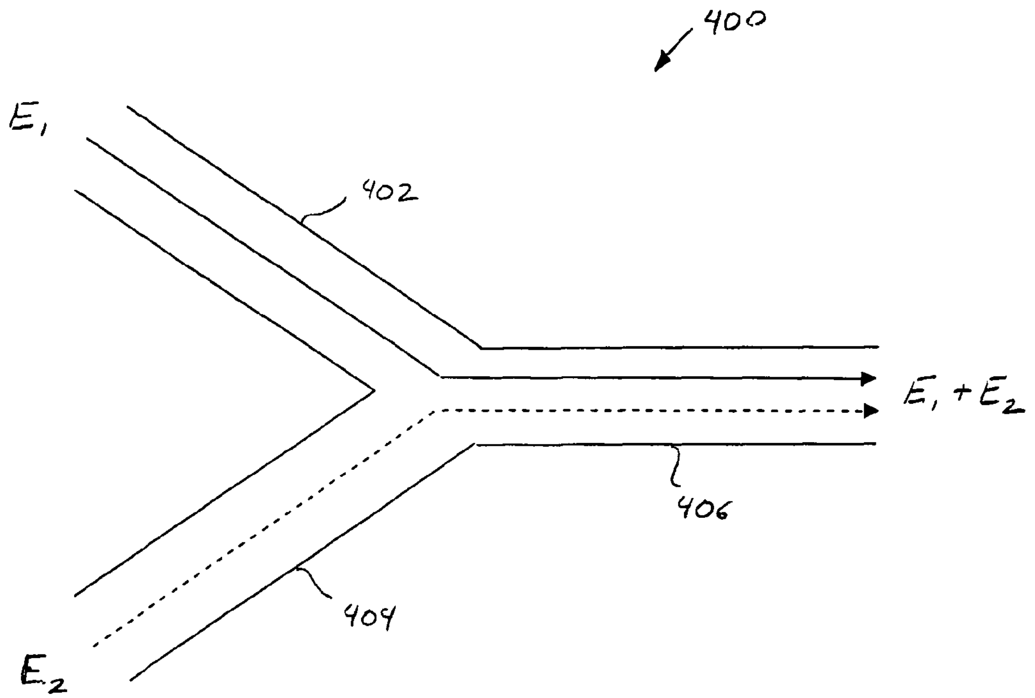
FIG. 4A illustrates an optical representation of a Y-shaped junction combiner.

A combiner receives incident beams of electromagnetic radiation, each beam transmitted in a separate waveguide, and outputs a single beam of electromagnetic radiation in a single waveguide. FIG. 4A illustrates an optical representation of a Y-shaped junction combiner 400. The Y-shaped junction combiner 400 comprises two intersecting input waveguides 402 and 404 and a single output waveguide 406. The waveguides 402, 404, and 406 can be ridge waveguides, waveguides in a photonic crystal, or atom-doped regions of a birefringent crystal. As shown in FIG. 4A, the Y-shaped junction combiner 400 receives a first beam of electromagnetic radiation with an electric field amplitude $E_1$ in the first waveguide 402 and a second beam of electromagnetic radiation with an electric field amplitude $E_2$ in the second waveguide 404 and outputs a single beam of electromagnetic radiation with an electric field amplitude $E_1+E_2$ in the waveguide 406. Note that, in general, a Y-junction combiner operates independent of the polarization states of the beams.

Figure 4B:
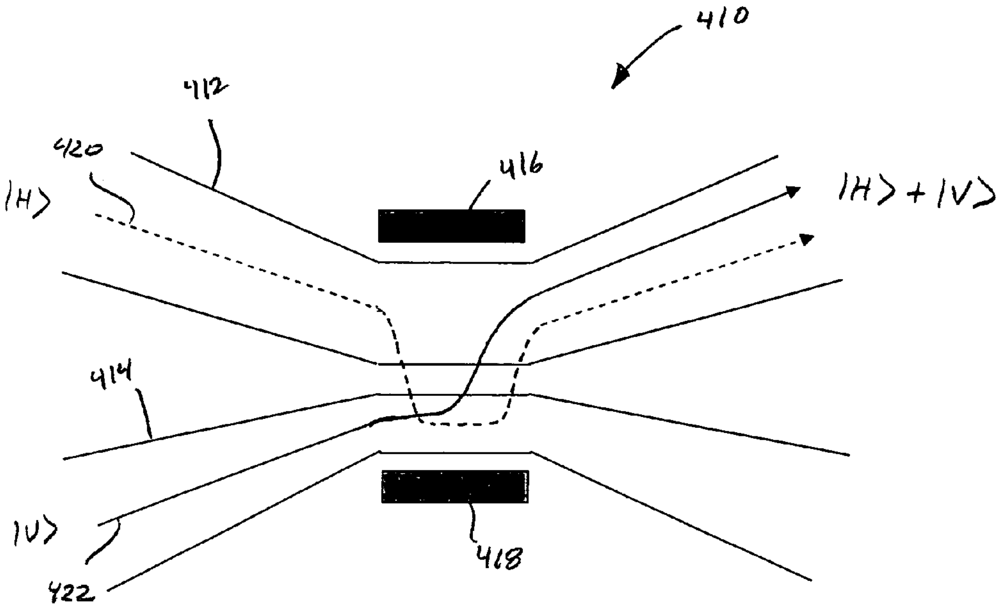
FIGS. 4B-4C illustrate an optical representation of an electronically tunable polarization combiner.
Figure 4C:
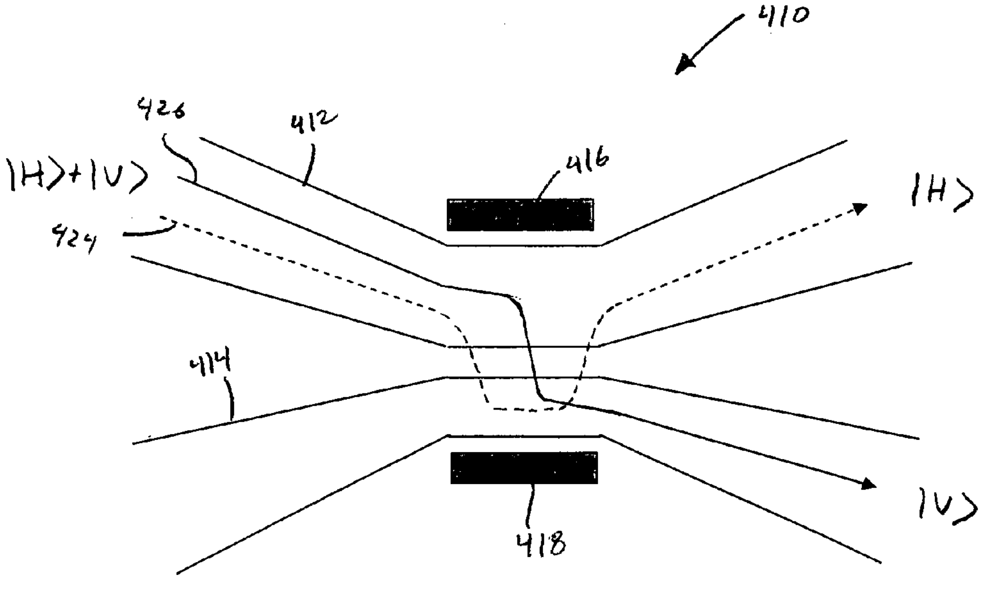

On the other hand, a polarization combiner receives a first beam of vertically polarized electromagnetic waves and a second beam of horizontally polarized electromagnetic waves, each beam transmitted in a separate waveguide, and outputs a beam comprising a superposition of both vertically and horizontally polarized electromagnetic waves in a single waveguide, or the polarization combiner receives a beam comprising a superposition of vertically and horizontally polarized electromagnetic waves in a waveguide and outputs a beam of horizontally polarized electromagnetic waves in one waveguide and a beam of vertically polarized electromagnetic waves in another waveguide. FIGS. 4B-4C illustrate an optical representation of an electronically tunable polarization combiner 410. The polarization combiner 410 comprises a first waveguide 412, a second waveguide 414, a first electrode 416, and a second electrode 418. The shape of the waveguides 412 and 414 are asymmetrical. For example, the width of the waveguide 414 is narrower than the width of the waveguide 412. Both the first waveguide 412 and the second waveguide 414 include bent regions where the waveguides 412 and 414 and the electrodes 416 and 418 are in close proximity to one another. The electrodes 416 and 418 can be tuned to control evanescent coupling of electromagnetic waves between the waveguides 412 and 414. Whether a polarized electromagnetic wave transmitted from the first waveguide 412 into the second waveguide 414 is transmitted back to the first waveguide 412 or remains in the second waveguide 414 depends on the polarization state of the electromagnetic wave and the magnitude of the electric field between the electrodes 416 and 418. For example, in FIG. 4B, a beam of horizontally polarized electromagnetic waves enters in the waveguide 412 and follows dashed-line path 420, and a beam of vertically polarized electromagnetic waves enters in the waveguide 414 and follows path 422. An electric field between the electrodes 416 and 418 can be tuned so that the beam of horizontally polarized electromagnetic waves 420 is transmitted from the waveguide 412 into the waveguide 414 and back into the waveguide 412, while the beam of vertically polarized electromagnetic waves 422 is transmitted from the waveguide 414 into the waveguide 412. A beam comprising the horizontally and vertically polarized electromagnetic waves exits the polarization combiner 410 in the same waveguide 414. In FIG. 4C, an electric field between the electrodes 416 and 418 can be tuned so that when a beam comprising both horizontally and vertically polarized electromagnetic waves, identified by dashed-line path 424 and path 426, respectively, enters the polarization combiner 410 in the same waveguide 412, a beam of horizontally polarized electromagnetic waves is transmitted from the waveguide 412 into the waveguide 414 and back into the waveguide 412, while a beam of vertically polarized electromagnetic waves is transmitted from the waveguide 412 into the waveguide 414. The beam of horizontally polarized electromagnetic waves exits the polarization combiner 410 in the waveguide 412, and the beam of vertically polarized electromagnetic waves exits the polarization combiner 410 in the waveguide 414.

Figure 5A:
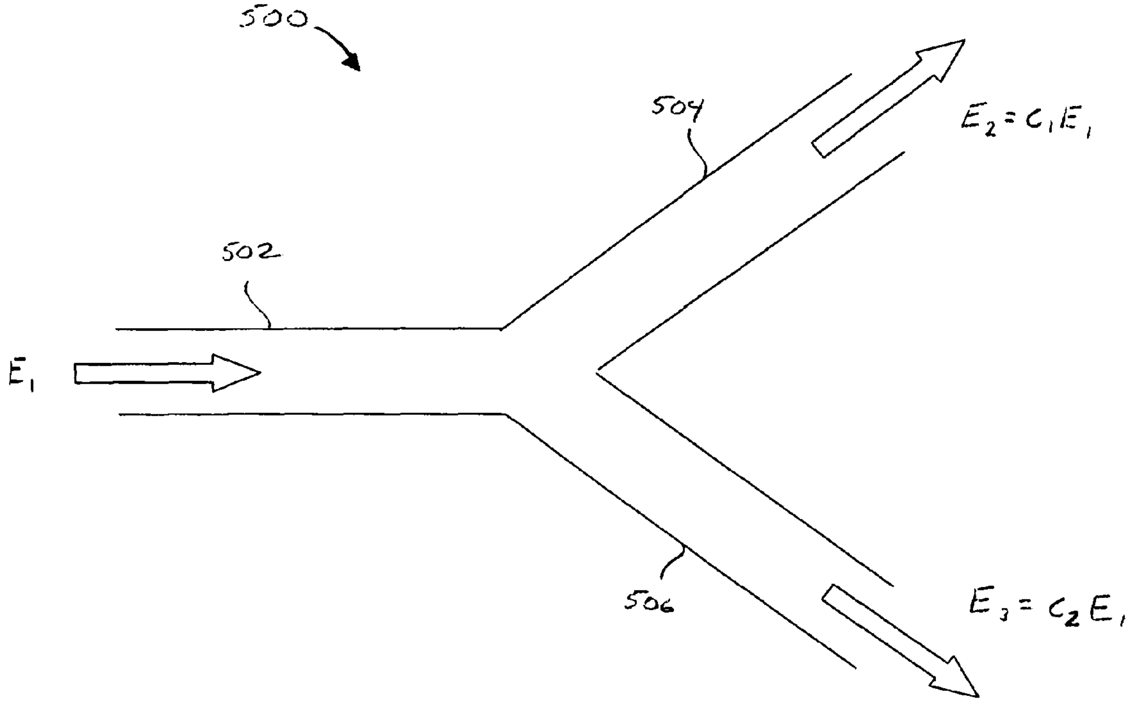
FIG. 5A illustrates a Y-shaped beamsplitter.

Beamsplitters ("BSs") are prominent components of optical signal-based computing and information processing systems. FIG. 5A illustrates a Y-shaped BS 500. The Y-shaped BS 500 comprises an input waveguide 502, a first output waveguide 504, and a second output waveguide 506. The energy associated with the input and output beams of electromagnetic radiation is conserved, for a Y-shaped BS 500 that is free of any lossless processes that can remove energy from the input electric fields. As shown in FIG. 5A, an incident beam of electromagnetic radiation with an electric field amplitude $E_1$ is split into two separate beams with electric field amplitudes:

$$E_2=c_2E_1, \text{ and}$$

$$E_3=c_3E_1$$

where $c_2$ and $c_3$ represent complex-valued coefficients that satisfy the condition:

$$|c_2|^2+|c_3|^2=1;$$

the beam with the electric-field component $E_2$ is transmitted in the output waveguide 504; and the beam with the electric-field component $E_3$ is transmitted in the output waveguide 506.

When the output waveguides 504 and 506 are symmetric, the Y-shaped BS 500 transmits 50% of the flux density of the incident beam in the output waveguide 504 and 50% in the output waveguide 506. The Y-shaped BS is called a "50:50 beamsplitter," and the corresponding coefficients $c_1$ and $c_2$ can both be equal to $1/\sqrt{2}$. In other words, the output waveguides 504 and 506 both transmit the same fraction of the flux density of an incident beam transmitted in the waveguide 502.

Figure 5B:
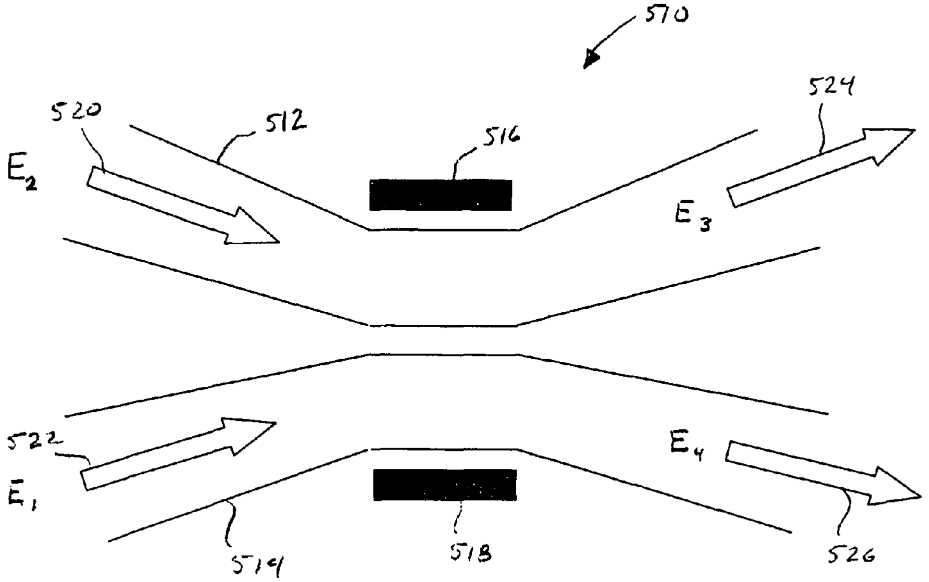
FIG. 5B illustrates an optical representation of an electronically tunable optical beamsplitter.
Figure 5C:
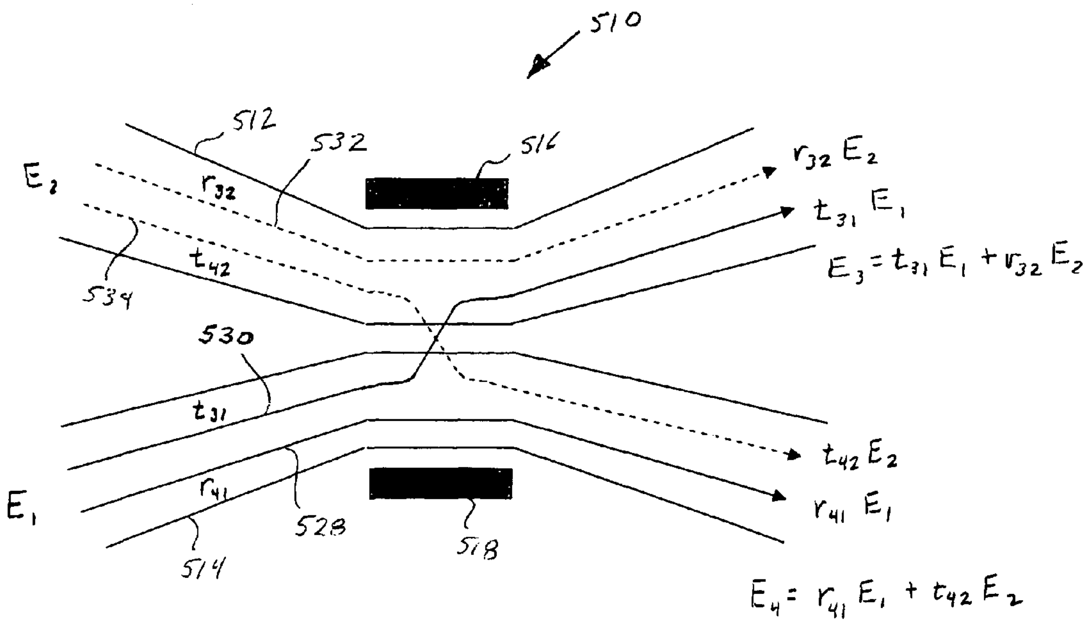
FIG. 5C illustrates reflections and transmissions of beams transmitted through the beamsplitter shown in FIG. 5B.

FIG. 5B illustrates an optical representation of an electronically tunable optical BS 510. The BS 510 comprises a first waveguide 512, a second waveguide 514, a first electrode 516, and a second electrode 518. Directional arrows 520 and 522 represent input beams of electromagnetic radiation with electric field amplitudes $E_1$ and $E_2$, respectively, and directional arrows 524 and 526 represents output beams of electromagnetic radiation with electric fields amplitudes denoted by $E_3$ and $E_4$, respectively. FIG. 5C illustrates reflections and transmissions of the beams input to the BS 510. Directional arrows 528 and 530 represent reflection and transmission paths of the electric field $E_1$, respectively, and dashed-line directional arrows 532 and 534 represent reflection and transmission paths of the electric field $E_2$, respectively. In FIG. 5C, $r_{41}E_1$ and $t_{31}E_1$ represent quantities of the electric field $E_1$ that are reflected and transmitted, and $r_{32}E_2$ and $t_{42}E_2$ represent quantities of the electric field $E_2$ that are reflected and transmitted, where $r_{31}$ and $r_{42}$ represent complex-valued reflection coefficients, and $t_{41}$ and $t_{32}$ represent complex-valued transmission coefficients, that satisfy the relations:

$$|r_{31}|^2+|t_{41}|^2=|r_{42}|^2+|t_{32}|^2=1, \text{ and}$$

$$r_{31}t_{32}^*+t_{41}r_{42}^*=0$$

For a BS 510 free of any lossless processes that can remove energy from the input electric fields, the energy associated with the input and output electric fields is conserved. As a result, the input electric field amplitudes $E_1$ and $E_2$ and the output electric field amplitudes $E_3$ and $E_4$ are mathematically related by the matrix equation:

$$\begin{bmatrix} E_3 \\ E_4 \end{bmatrix} = \begin{bmatrix} t_{31} & r_{32} \\ r_{41} & t_{42} \end{bmatrix} \begin{bmatrix} E_1 \\ E_2 \end{bmatrix}$$

By varying the strength of an electric field between the electrodes 516 and 518, the BS 510 can be tuned to reflect and transmit any desired fraction of the flux densities of the incident beams. For example, an appropriately applied electric field between the electrodes 516 and 518 can reflect 40% and transmit 60% of the flux density of incident beam, or the strength of the electric field between the electrodes 516 and 518 can be tuned to reflect 50% and transmit 50% of an incident beam. A BS that reflects and transmits 50% of an incident beam is called a "50:50 beamsplitter," and the reflection and transmission coefficients can be given by:

$$U_{BS} = \frac{1}{\sqrt{2}}\begin{bmatrix} 1 & 1 \\ -1 & 1 \end{bmatrix}$$

Figure 6:
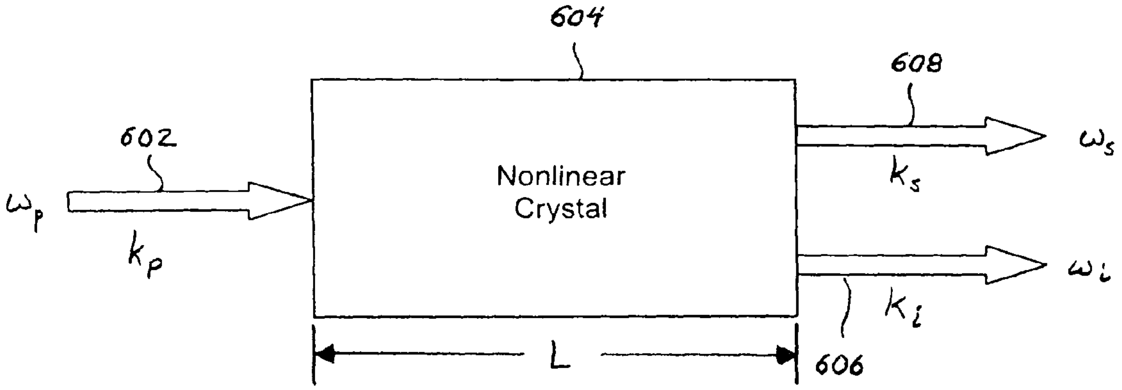
FIG. 6 illustrates a birefringent nonlinear crystal that splits a pump beam into signal and idler photon beams.

In spontaneous parametric-down conversion ("SPDC"), a birefringent nonlinear crystal splits an incident beam of electromagnetic radiation in a coherent state $|\alpha\rangle$, called a "pump beam," into a pair of photon beams called a "signal beam" and an "idler beam." FIG. 6 illustrates a birefringent nonlinear crystal that splits a pump beam in a coherent state $|\alpha\rangle$ into a pair of signal and idler photon beams. In FIG. 6, a pump beam 602 with a frequency $\omega_p$ and wavenumber $k_p$ is incident on a nonlinear crystal 604 of length L. The pump beam 602 generates a first and a second nonlinear polarization waves within the nonlinear crystal 604. The first nonlinear polarization wave is called an "idler" wave that oscillates with a frequency denoted by $\omega_i$, and the second nonlinear polarization wave is called a "signal" wave that oscillates with a frequency denoted by $\omega_s$. The terms "signal" and "idler" are historical terms that have no special significance. As a result, the choice of beam labels is arbitrary. When the relative phases of the two nonlinear polarization waves and the initial pump wave add constructively, an idler beam 606 is output with the frequency $\omega_i$ and corresponding wavenumber $k_i$, and a signal beam 608 is output with the frequency $\omega_s$ and corresponding wavenumber $k_s$.

In the down-conversion process, the quantum states of the nonlinear crystal are left unchanged. In other words, the initial and final quantum-mechanical states of the nonlinear crystal 604 are identical. The different idler and signal beams 606 and 608 output from the nonlinear crystal 604 are the result of nonlinearity and birefringence, and the refractive index of the nonlinear crystal depends on the direction of polarization of the incident electromagnetic wave.

Figures 7A, 7B, 7C:
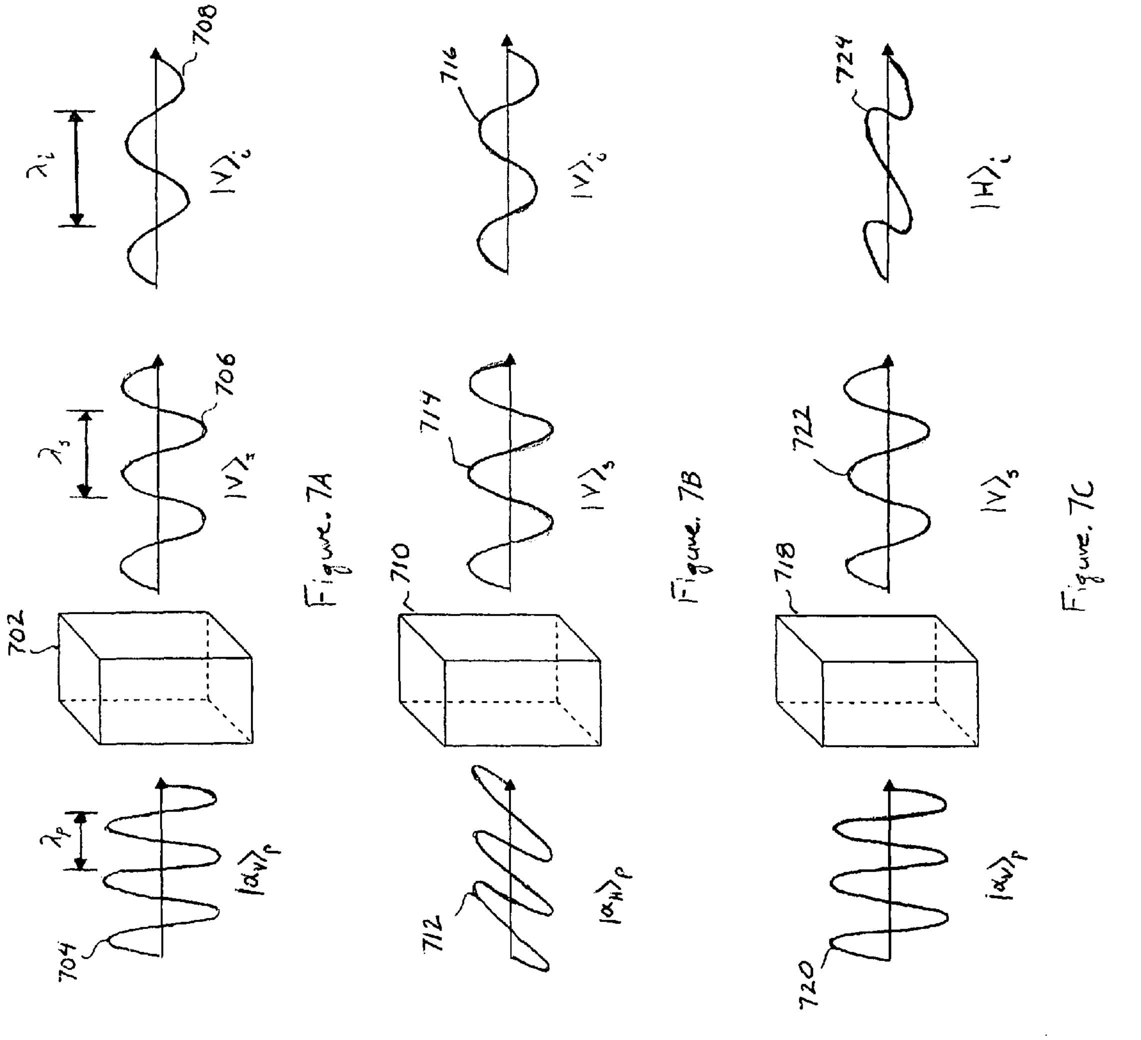
FIGS. 7A-7B illustrate two examples of Type I down-conversion.
FIG. 7C illustrates an example of a Type II down-conversion.

There are two types of down-conversion processes. The first, called "Type I down conversion," occurs when the signal and idler beams have identical polarizations, and the second, called "Type II down conversion," occurs when the signal and idler beams have orthogonal polarizations. FIGS. 7A-7B illustrate two examples of Type I down-conversion. In FIG. 7A, a first Type I down-conversion crystal ("DCC") 702 receives a vertically polarized pump beam 704 in a coherent state denoted by $|\alpha_V\rangle_p$ and outputs both a vertically polarized signal photon $|V\rangle_s$ 706 and a vertically polarized idler photon $|V\rangle_i$ 708. In FIG. 7B, a second Type I DCC 710 receives a horizontally polarized pump beam 712 in a coherent state denoted by $|\alpha_H\rangle_p$ and outputs both a vertically polarized signal photon $|V\rangle_s$ 714 and a vertically polarized idler photon $|V\rangle_i$ 716. FIG. 7C illustrates an example of Type II down-conversion. The Type II DCC 718 receives a vertically polarized pump beam 720 in a coherent state denoted by $|\alpha_V\rangle_p$ and simultaneously outputs both a vertically polarized signal photon $|V\rangle_s$ 722 and a horizontally polarized idler photon $|H\rangle_i$ 724.

The efficiency of a nonlinear crystal can be assessed by examining the intensities of the signal and idler beams, which can be written as:

$$I_s = I_s(\max)\left(\frac{\sin(\Delta kL/2)}{\Delta kL/2}\right)^2,$$

and $$I_i = I_i(\max)\left(\frac{\sin(\Delta kL/2)}{\Delta kL/2}\right)^2,$$

respectively, where $I_s$ (max) and $I_i$ (max) are the maximum signal and idler beam intensities that can be output from a nonlinear crystal;

L is the length of the nonlinear crystal; and $\Delta k=k_p-k_s-k_i$ is called the "wavevector, or momentum, mismatch."

Figure 8A:
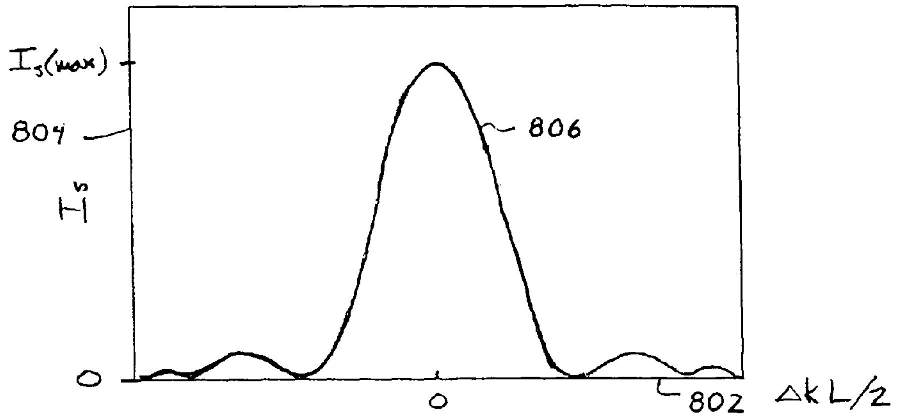
FIG. 8A is a plot of signal beam intensity.

FIG. 8A is a plot of signal beam intensity $I_s$ versus $\Delta kL/2$. As shown in FIG. 8A, horizontal axis 802 corresponds to a range of $\Delta kL/2$ values, vertical axis 804 corresponds to the signal beam intensities, and curve 806 represents the signal beam intensity as a function of $\Delta kL/2$. The curve 806 shows a maximum efficiency, or intensity, when $\Delta k$ equals zero and shows that as $|\Delta k|L$ increases, the efficiency of the nonlinear crystal decreases. As a result, power can flow backward from the signal and idler beams into the pump beam for large nonzero values of $|\Delta k|L$. The maximum efficiency ($\Delta k=0$) is achieved when the electromagnetic waves involved in the down-conversion process are phase matched so that they add constructively in the forward propagating direction. Note that a similarly shaped intensity curve $I_i$ centered about the wavevector mismatch Δk equal to zero can also be plotted for the idler beam.

The phase-matching condition (Δk=0) can often be obtained by carefully controlling the refractive indices associated with each of the pump, signal, and idler beams. Typically, phase matching is achieved by either angle tuning or temperature tuning, both of which are well-known phase-matching techniques. However, there are circumstances when angle and temperature tuning techniques are not suitable for maintaining the phase-matching condition. For example, certain nonlinear crystals may possess insufficient birefringence to compensate for the dispersion of the linear refractive indices over a wide wavelength range, and for other nonlinear crystals, electromagnetic radiation with increasingly shorter wavelengths causes the index of refraction associated with the signal beam to approach the index of refraction of the idler beam.

Figure 8B:
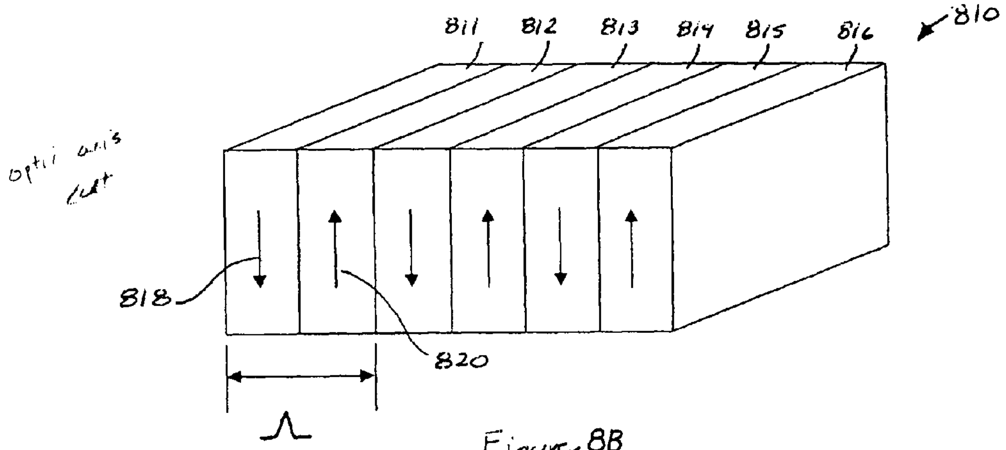
FIG. 8B illustrates a hypothetical periodically poled down-conversion crystal.

Quasi-phase matching can be used when normal phase matching cannot be implemented. Quasi-phase matching is accomplished by periodically poling down-conversion crystals. FIG. 8B illustrates a hypothetical periodically poled down-conversion crystal 810. The down-conversion crystal 810 comprises 6 alternating layers 811-816 of the same birefrigent material. The crystal lattices of the layers 811, 813, and 815 are all oriented in the same direction, as indicated by downward directed arrows, such as downward directed arrow 818. In contrast, the crystal lattices of the layers 812, 814, and 816 are all oriented in the opposite direction of the layers 811, 812, and 815, as indicated by the upward directed arrows, such as upward directed arrow 820. The period of the alternating layers is represented by Λ. Methods for periodically poling a nonlinear crystal are well-known in the art.

Figure 8C:
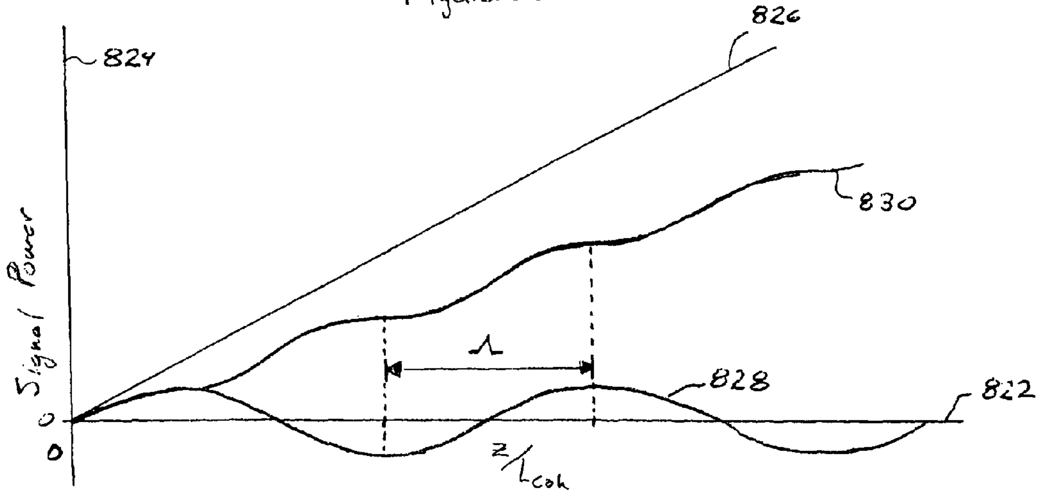
FIG. 8C is a plot of signal power generated by pump beams propagating through three different nonlinear crystals.

The following discussion describes how periodic poling can compensate for a non-zero wavevector mismatch Δk by examining how the power of the signal is changed by the properties for three different nonlinear crystals. FIG. 8C is a plot of three signal powers, each associated with signals propagating through a different nonlinear crystal. As shown in FIG. 8C, horizontal axis 822 corresponds to the propagation distance within each nonlinear crystal, and vertical axis 824 corresponds to the power of the signal field propagating though each nonlinear crystal in the presence of a strong pump field. Curve 826 shows that for a first single nonlinear crystal with perfectly phase-matched interaction (Δk=0), the signal power grows linearly with propagation distance z. In contrast, curve 828 is associated with a second single nonlinear crystal, however, due to a nonzero wavevector mismatch, the field power oscillates. As a result, the average field power over the propagation distance of the second nonlinear crystal is zero. Curve 830 is associated with a periodically poled nonlinear crystal. The curve 830 shows that by periodically poling a nonlinear crystal that normally exhibits nonzero wavevector mismatch, when the power of the signal is about to decrease as a consequence of wavevector mismatch, a reversal occurs at the end of period Λ, which allows the power to grow monotonically. Similar considerations can be applied to the idler beam.

The wavevector mismatch for a periodically poled nonlinear crystal is give by:

$$\Delta k_Q = k_p - k_s - k_i \pm \frac{2\pi}{\Lambda},$$

and the optimum period is:

$$\Lambda = \pm\frac{2\pi}{k_p - k_s - k_i}$$

EMBODIMENTS OF THE PRESENT INVENTION

Figure 9:
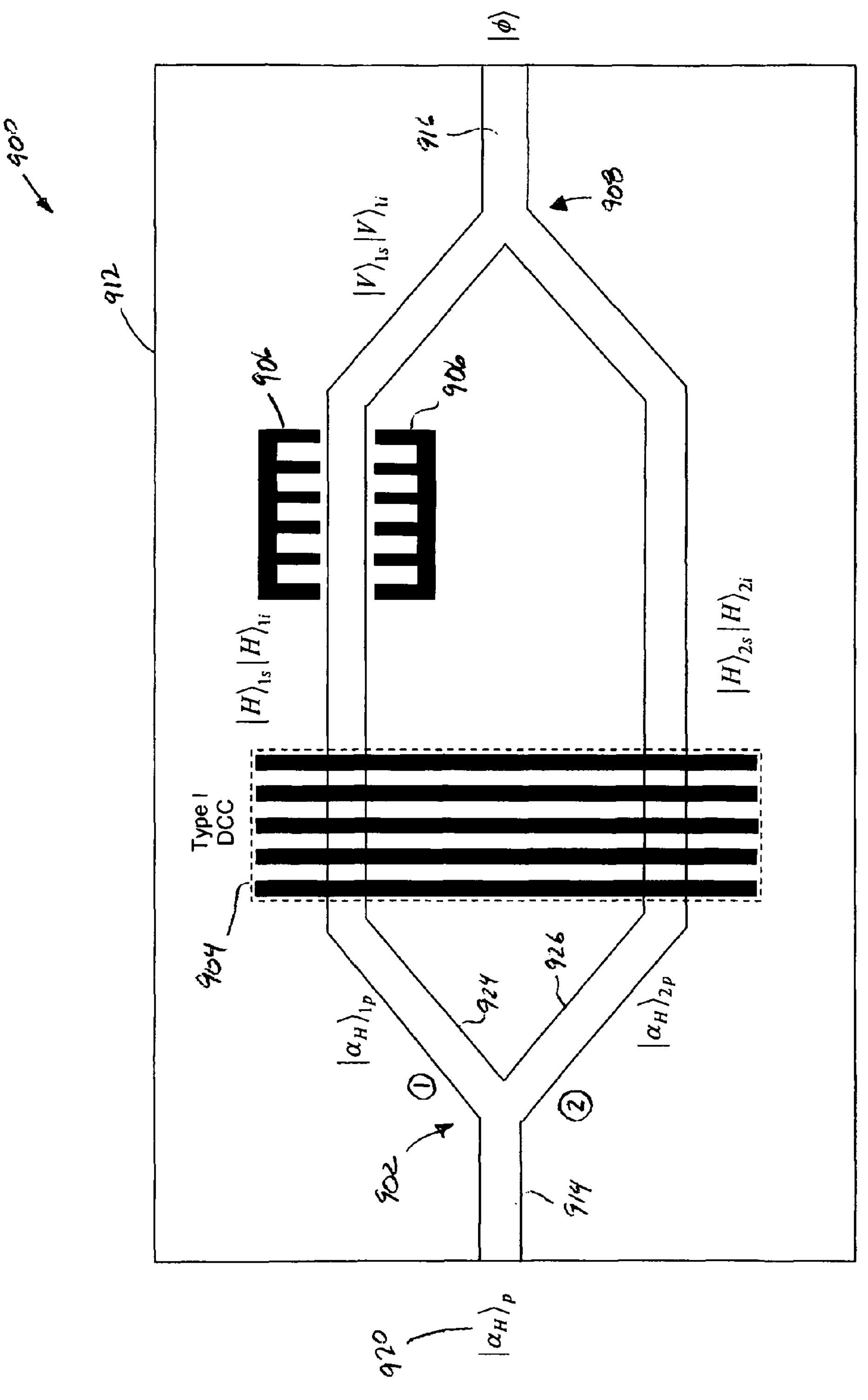
FIG. 9 illustrates a schematic plan view of a first single crystal, polarization entangled-photon source that represents an embodiment of the present invention.

FIG. 9 illustrates a schematic plan view of a first single crystal, polarization entangled-photon source 900 that represents an embodiment of the present invention. The entangled-photon source 900 comprises a 50:50 Y-shaped BS 902, a periodically-poled Type I DCC 904, a TE/TM mode converter 906, and a Y-shaped combiner 908, all of which are components embedded in a single transmission layer 912. The transmission layer 912 can be a z-cut nonlinear crystal, such as z-cut $LiNbO_3$ ("lithium niobate") $KTiOPO_4$ ("KTP"), $KTiOAsO_4$ ("KTA"), β-$BaB_2O_4$ ("β-BBO"), or any other suitable nonlinear crystal material, or electrooptic polymer. The transmission layer 912 includes an optic axis, and the term "z-cut" indicates that the optic axis is directed perpendicular to the plane of the transmission layer 912. The entangled-photon source 900 also includes a number of strip waveguides, such as waveguide 914, embedded in the transmission layer 912. The waveguides are configured for transmitting electromagnetic radiation between the components and for transmitting electromagnetic radiation into and out of the source 900. The waveguides can be regions of the transmission layer 912 that have been etched to form isolated ridge waveguides, or the waveguides can be regions of the transmission layer 912 that have a higher refractive index than the rest of the transmission layer 912. The high-refractive-index waveguides can be created by doping certain regions with protons or atoms. For example, waveguides with a higher refractive index than the rest of a $LiNbO_3$ transmission layer can be created in the $LiNbO_3$ transmission layer by infusing regions of the $LiNbO_3$ transmission layer with Ti. The transmission layer 912 can be supported by a $SiO_2$, poly(methyl methacrylate) ("PMMA"), or any other substrate (not shown) that has a lower refractive index than the transmission layer 912 and does interfere with the transmission of electromagnetic radiation in the waveguides.

The entangled-photon source 900 receives a pump beam in either a horizontally or vertically polarized coherent state from a pump beam source (not shown). The term "horizontal" refers to electromagnetic waves with the electric field component polarized parallel to the plane of an entangled-photon source, and the term "vertical" refers to electromagnetic waves with the electric field component polarized orthogonal to the plane of the entangled-photon source. The pump beam can be a continuous electromagnetic wave or an electromagnetic-wave pulse that is input in the waveguide 914. The entangled-photon source 900 outputs polarization-entangled photons in a state represented by:

$$|\phi\rangle = \frac{1}{\sqrt{2}}(|V\rangle_s|V\rangle_i + e^{i\theta}|H\rangle_s|H\rangle_i)$$

where $|H\rangle_s$, and $|V\rangle_s$ represent horizontally and vertically polarized signal labeled photons;

$|H\rangle_i$ and $|V\rangle_i$ represent horizontally and vertically polarized idler labeled photons; and θ is a relative phase difference between the horizontally and vertically polarized photons.

The polarization-entangled photons in the state $|\phi\rangle$ are output in a waveguide 916. The waveguide 916 can be connected to a quantum computer, quantum information processor or storage device, a quantum-cryptographic device, quantum teleportation device or other optical-based device or network.

The following discussion describes generating polarization-entangled photons in the state $|\phi\rangle$ using a horizontally polarized pump beam 920 in a coherent state, denoted by $|\alpha_H\rangle_p$. The 50:50 BS 902 receives the pump beam $|\alpha_H\rangle_p$ 920 in the waveguide 914 and outputs two path dependent pump beams in a coherent linear superposition of states given by:

$$|\beta\rangle = \frac{1}{2}(|\alpha_H\rangle_{1p} + |\alpha_H\rangle_{2p})$$

where $|\alpha_H\rangle_p$ represents a horizontally polarized pump beam transmitted in a first waveguide 924; and $|\alpha_H\rangle_{2p}$ represents a horizontally polarized pump beam transmitted in a second waveguide 926.

The Type I DCC 904 converts the horizontally polarized pump beam $|\alpha_H\rangle_{1p}$ transmitted in the first waveguide 924 into a pair of horizontally polarized signal and idler photons as follows:

$$|\alpha_H\rangle_{1p} \xrightarrow{Type\ I} |H\rangle_{1s}|H\rangle_{1i}$$

and also converts the horizontally polarized pump beam $|\alpha_H\rangle_{2p}$ transmitted in the second waveguide 926 into a pair of horizontally polarized signal and idler photons as follows:

$$|\alpha_H\rangle_{2p} \xrightarrow{Type\ I} |H\rangle_{2s}|H\rangle_{2i}$$

The TE/TM mode converter 906 receives the horizontally polarized signal and idler photons $|H\rangle_{1s}|H\rangle_{1i}$ and outputs vertically polarized signal and idler photons $|V\rangle_{1s}|V\rangle_{1i}$, as described above with reference to FIG. 3. The Y-shaped combiner 908 receives the signal and idler photons $|V\rangle_{1s}|V\rangle_{1i}$, transmitted in the waveguide 924 and the signal and idler photons $|H\rangle_{1s}|H\rangle_{1i}$ transmitted in the waveguide 926 and outputs polarization-entangled photons in the state $|\phi\rangle$ in the waveguide 916, as described above with reference to FIG. 4A. In an alternate embodiment of the present invention, a vertically polarized pump beam $|\alpha_V\rangle_p$ input in the waveguides 914 also outputs polarization-entangled photons in the state $|\phi\rangle$ in the waveguide 916.

Figure 10:
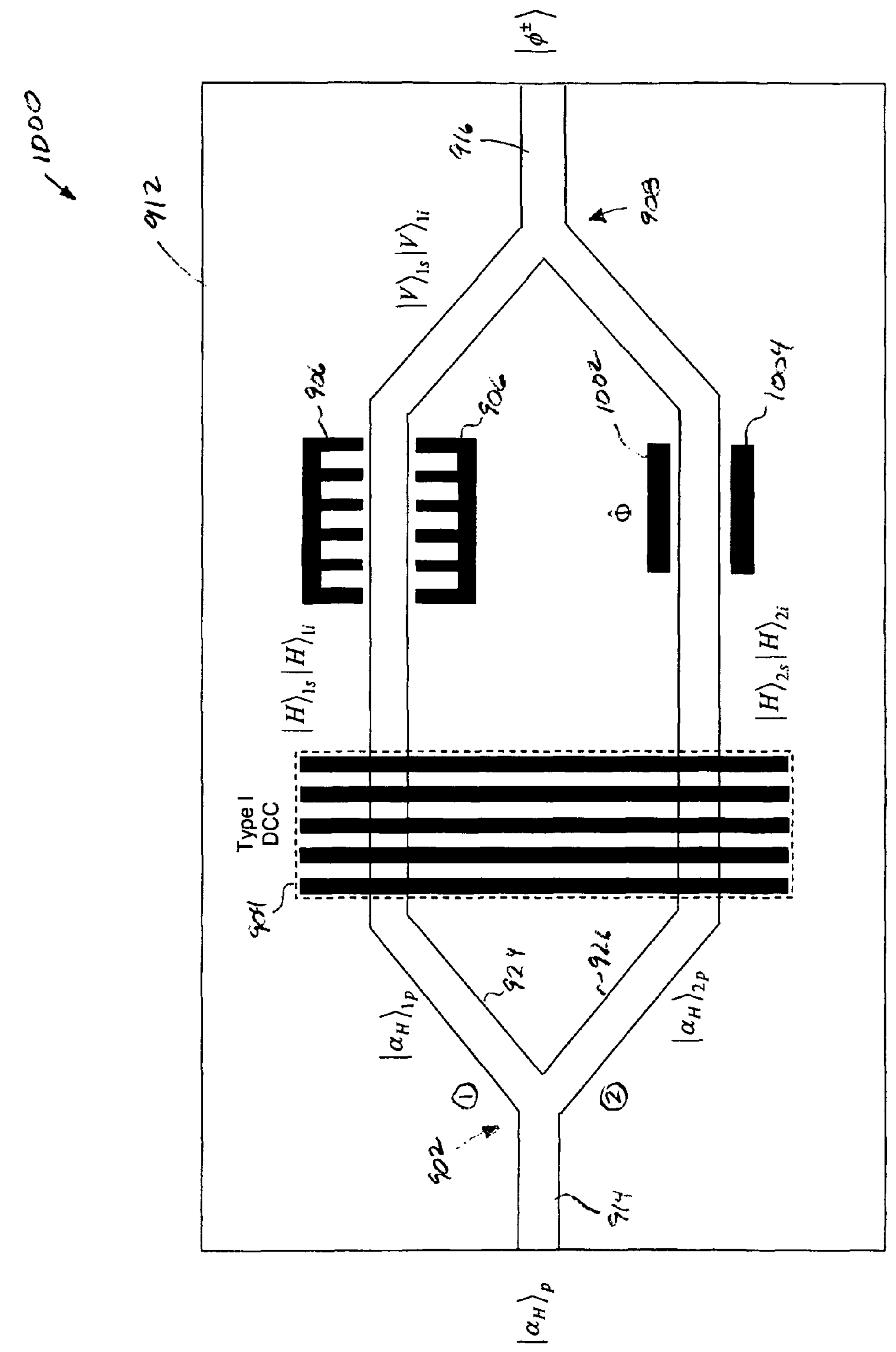
FIG. 10 illustrates a schematic plan view of a second single crystal, polarization entangled-photon source that represents an embodiment of the present invention.

In an alternate embodiment of the present invention, the phase difference θ acquired by the signal and idler photons can be adjusted by applying a voltage across one of the internal waveguides 924 and 926. FIG. 10 illustrates a schematic plan view of a second single crystal, polarization entangled-photon source 1000 that includes electrodes for applying a voltage across a waveguide and represents an embodiment of the present invention. The entangled-photon source 1000 is identical to the entangled-photons source 900, shown in FIG. 9, except for the electrodes 1002 and 1004 located on opposite sides of the waveguide 926. In the interest of brevity, structurally identical components in both of the entangle-state sources 900 and 1000 have been provided with the same reference numerals and an explanation of their structure and function is not repeated. The applied voltage can be tuned to induce a phase adjustment in the state of the polarized photons transmitted in the waveguide 926 that is mathematically represented by an operator:

$$\hat{\Phi}=\exp[i(2\pi n-\theta)]$$

where n=0, ±1/2, ±1, ±3/2, ±2, . . . is a phase adjustment parameter that can be determined by the voltage applied to the waveguide 928.

The voltage applied across the waveguide 926 causes a phase adjustment that is mathematically represented by:

$$|\phi\rangle \xrightarrow{\hat{\Phi}} \frac{1}{\sqrt{2}}(|V\rangle_s|V\rangle_i + e^{i(2\pi n-\theta)}e^{i\theta}|H\rangle_s|H\rangle_i) = \frac{1}{\sqrt{2}}(|V\rangle_s|V\rangle_i + e^{i2\pi n}|H\rangle_s|H\rangle_i) = |\phi^{(n)}\rangle$$

When the voltage is adjusted to correspond to an integral valued phase adjustment parameter n, the polarization entangled-photon state output is the Bell state:

$$|\phi^+\rangle = \frac{1}{\sqrt{2}}(|V\rangle_s|V\rangle_i + |H\rangle_s|H\rangle_i)$$

When the voltage is adjusted to correspond to a half-integral valued phase adjustment parameter n, the polarization-entangled photon state output is the Bell state:

$$|\phi^-\rangle = \frac{1}{\sqrt{2}}(|V\rangle_s|V\rangle_i - |H\rangle_s|H\rangle_i)$$

Figure 11:
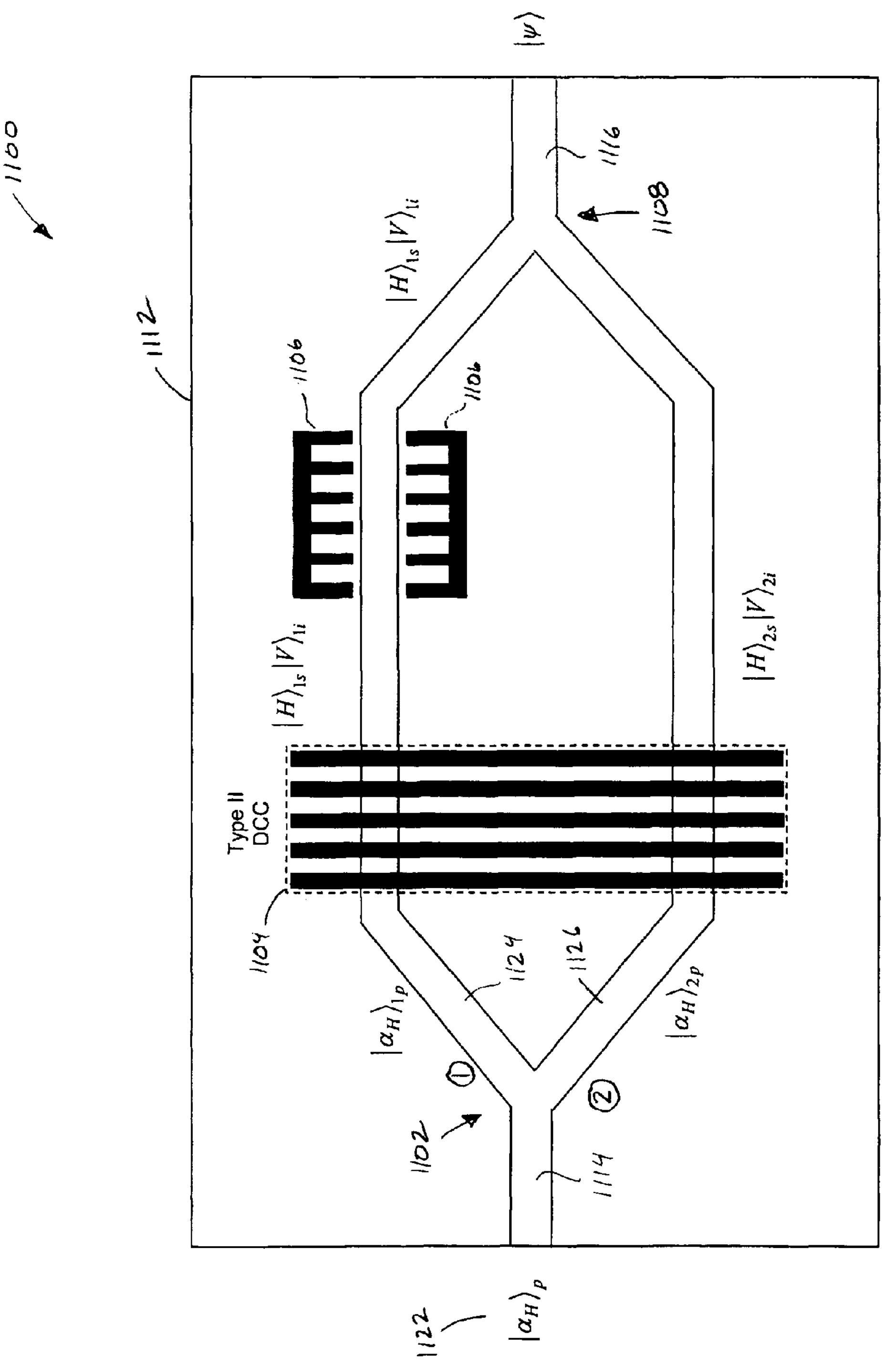
FIG. 11 illustrates a schematic plan view of a third single crystal, polarization entangled-photon source that represents an embodiment of the present invention.

FIG. 11 illustrates a schematic plan view of a third single crystal, polarization entangled-photon source 1100 that represents an embodiment of the present invention. The entangled-photon source 1100 comprises a 50:50 Y-shaped BS 1102, a periodically-poled Type II DCC 1104, a TE/TM mode converter 1106, and a Y-shaped combiner 1108, all of which are components embedded in a single transmission layer 1112. The transmission layer 1112 can be a z-cut nonlinear crystal, such as lithium niobate, KTP, KTA, β-BBO, or any other suitable nonlinear crystal, or electrooptic polymer. The entangled-photon source 1100 also includes a number of strip waveguides embedded in the transmission layer 1112. The waveguides can be regions of the transmission layer 1112 that have been etched to form isolated ridge waveguides or regions doped with protons or atoms to increase the refractive index of the waveguides above that of the rest of the transmission layer 1112, as described above with reference to FIG. 9. The transmission layer 1112 can be supported by a $SiO_2$, PMMA, or any other substrate (not shown) that has a lower refractive index than the transmission layer 1112 and does not interfere with electromagnetic waves transmitted in the waveguides.

The entangled-photon source 1100 receives a pump beam in either a horizontally or vertically polarized coherent state from a pump beam source (not shown). The pump beam can be a continuous electromagnetic wave or an electromagnetic-wave pulse that is input in a waveguide 1114. The entangled-photon source 1100 outputs in a waveguide 1116 polarization-entangled photons in a state represented by:

$$|\psi\rangle = \frac{1}{\sqrt{2}}(|H\rangle_s|V\rangle_i + e^{i\theta}|V\rangle_s|H\rangle_i)$$

The waveguides 1116 can be connected to a quantum computer, quantum information processor or storage device, a quantum-cryptographic device, quantum teleportation device, or other optical-based device or network.

The following discussion describes generating polarization-entangled photons in the state $|\psi\rangle$ using a pump beam in the horizontally polarized state $|\alpha_H\rangle_p$ 1122. The 50:50 Y-shaped BS 1102 receives the pump beam $|\alpha_H\rangle_p$ 1122 in the waveguide 1114 and outputs two path dependent pump beams in a coherent linear superposition of states given by:

$$|\beta\rangle = \frac{1}{\sqrt{2}}(|\alpha_H\rangle_{1p} + |\alpha_H\rangle_{2p})$$

where $|\alpha_H\rangle_{1p}$ represents a horizontally polarized pump beam transmitted in a first waveguide 1124; and $|\alpha_H\rangle_{2p}$ represents a horizontally polarized pump beam transmitted in a second waveguide 1126.

The Type II DCC 1104 converts the horizontally polarized pump beam $|\alpha_H\rangle_{1p}$ transmitted in the first waveguide 1124 into a pair of horizontally and vertically polarized signal and idler photons as follows:

$$|\alpha_H\rangle_{1p} \xrightarrow{Type\ II} |H\rangle_{1s}|V\rangle_{1i}$$

and converts the horizontally polarized pump beam $|\alpha_H\rangle_{2p}$ transmitted in the second waveguide 1126 into another pair of horizontally and vertically polarized signal and idler photons as follows:

$$|\alpha_H\rangle_{2p} \xrightarrow{Type\ II} |H\rangle_{2s}|V\rangle_{2i}$$

The TE/TM mode converter 1106 receives the horizontally polarized signal and vertically polarized idler photons represented by the product state $|H\rangle_{1s}|V\rangle_{1i}$ and outputs vertically polarized signal and horizontally polarized idler photons represented by the product state $|V\rangle_{1s}|H\rangle_{1i}$, as described above with reference to FIG. 3. The Y-shaped combiner 1108 receives the pair of photons in the state $|V\rangle_{1s}|H\rangle_{1i}$ transmitted in the waveguide 1124, and the pair of photons in the state $|H\rangle_{2s}|V\rangle_{2i}$ transmitted in the waveguide 1126, and outputs in the waveguide 1116 polarization-entangled photons in the state $|\psi\rangle$.

Figure 12:
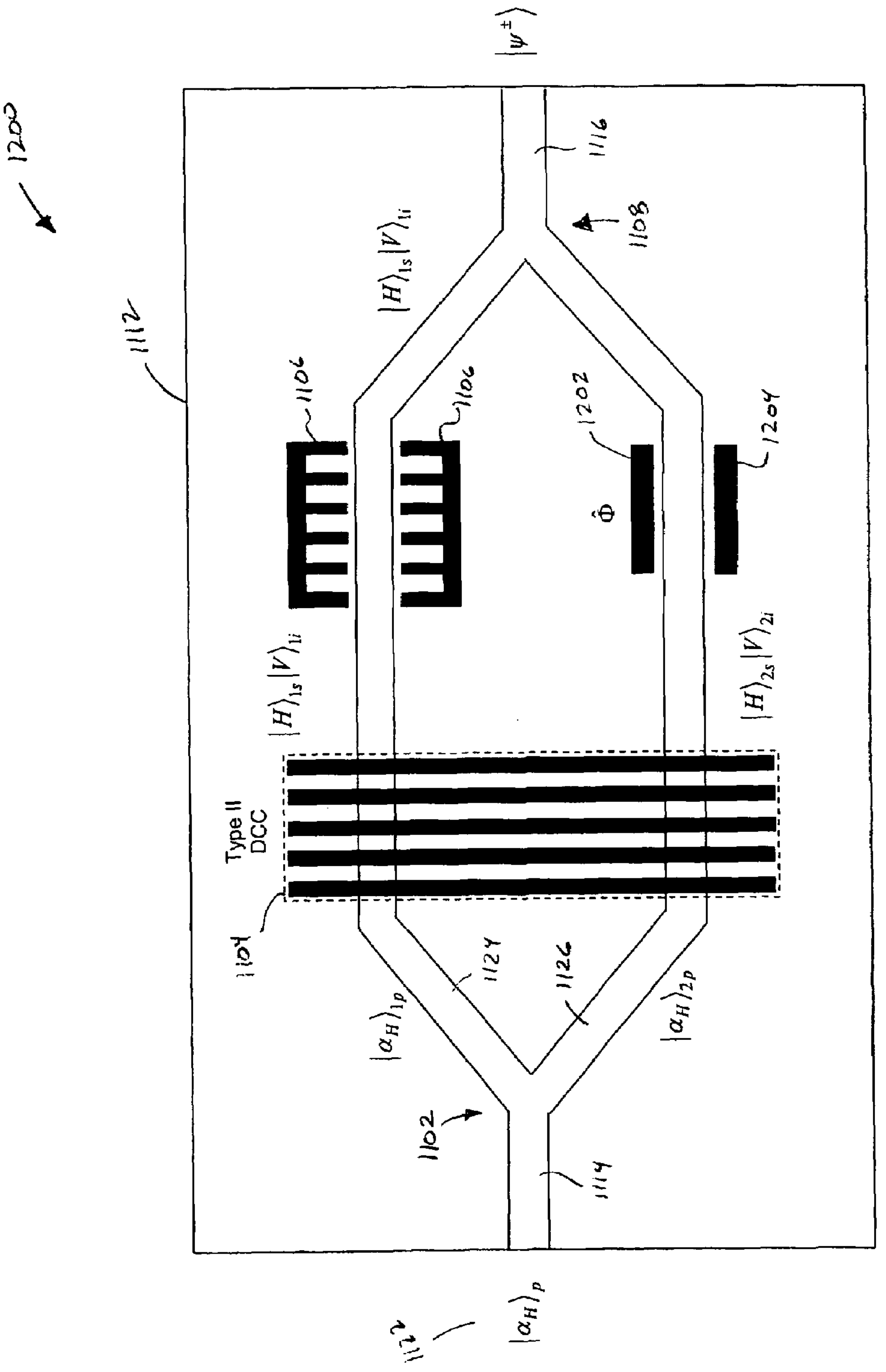
FIG. 12 illustrates a schematic plan view of a fourth single crystal, polarization entangled-photon source that represents an embodiment of the present invention.

In an alternate embodiment of the present invention, the phase difference θ acquired by the signal and idler photons can be adjusted by applying a voltage across one of the internal waveguides 1124 and 1126. FIG. 12 illustrates a schematic plan view of a fourth single crystal, polarization entangled-photon source 1200 that includes electrodes for applying a voltage across a waveguide and represents an embodiment of the present invention. The entangled-photon source 1200 is identical to the entangled-photons source 1100, shown in FIG. 11, except for the electrodes 1202 and 1204 located on opposite sides of the waveguide 1126. In the interest of brevity, structurally identical components in both of the entangle-state sources 1100 and 1200 have been provided with the same reference numerals and an explanation of their structure and function is not repeated. The voltage applied across the waveguide 1126 can be tuned to induce a phase adjustment that is mathematically represented by the operator $\hat{\Phi}$ described above with reference to FIG. 10. When the voltage across the waveguide 1126 is adjusted to correspond to an integral valued phase adjustment parameter n, the polarization entangled-photon state output is the Bell state:

$$|\psi^+\rangle = \frac{1}{\sqrt{2}}(|H\rangle_s|V\rangle_i + |V\rangle_s|H\rangle_i)$$

When the voltage across the waveguide 1126 is adjusted to correspond to a half-integral valued phase adjustment parameter n, the polarization-entangled photon state output is the Bell state:

$$|\psi^-\rangle = \frac{1}{\sqrt{2}}(|H\rangle_s|V\rangle_i - |V\rangle_s|H\rangle_i)$$

Figure 13:
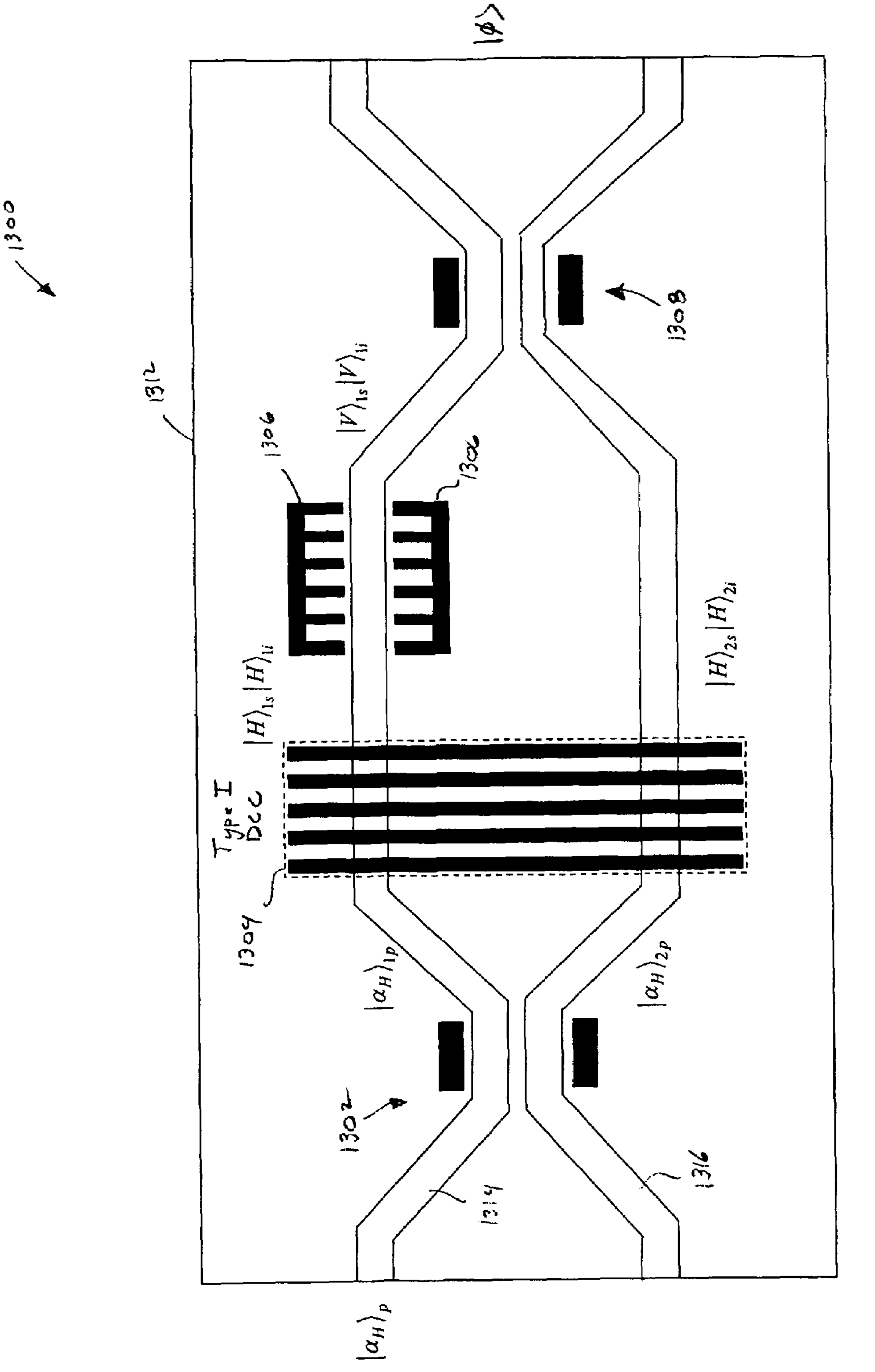
FIG. 13 illustrates a schematic plan view of a fifth single crystal, polarization entangled-photon source that represents an embodiment of the present invention.

FIG. 13 illustrates a schematic plan view of a fifth single crystal, polarization entangled-photon source 1300 that represents an embodiment of the present invention. The entangled-photon source 1300 comprises a 50:50 electronically controlled BS 1302, a periodically-poled Type I DCC 1304, a TE/TM mode converter 1306, and an electronically controlled polarization combiner 1308, all of which are components embedded in a single transmission layer 1312. The transmission layer 1312 can be a z-cut nonlinear crystal or electrooptic polymer, as described above with reference to FIGS. 9 and 11. The entangled-photon source 1300 also includes a number of strip waveguides, that can be configured as described above with reference the first entangled-photon source 900 shown in FIG. 9. The transmission layer 1312 can be supported by a $SiO_2$, poly(methyl methacrylate) ("PMMA"), or any other substrate (not shown) that has a lower refractive index than the transmission layer 1312 and does interfere with the transmission of electromagnetic radiation in the waveguides.

The entangled-photon source 1300 receives a pump beam in either a horizontally or vertically polarized coherent state from a pump beam source (not shown) in either the waveguide 1314 or the waveguide 1316. The pump beam can be a continuous electromagnetic wave or an electromagnetic-wave pulse that is input in either the waveguide 1314 or the waveguide 1316. The electronically controlled BS 1302 and the electronically controlled polarization combiner 1308 can be tuned so that the entangled-photon source 1300 outputs polarization-entangled photons in the state $|\phi\rangle$. The polarization-entangled photons can be output in either the waveguide 1314 or the waveguide 1316. The waveguides 1314 and 1316 can be connected to a quantum computer, quantum information processor or storage device, a quantum-cryptographic device, quantum teleportation device, or other optical-based device or network.

Figure 14:
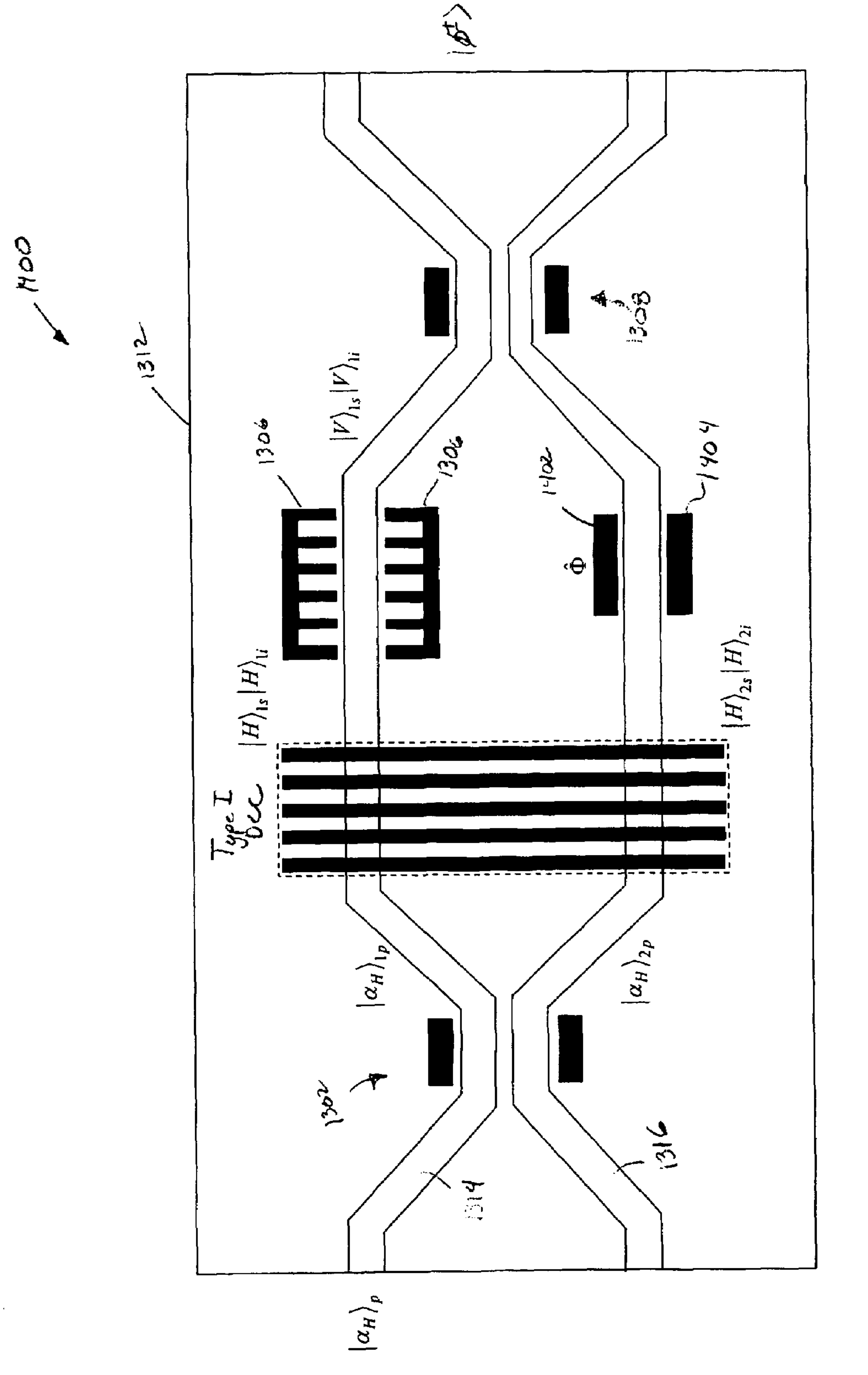
FIG. 14 illustrates a schematic plan view of a sixth single crystal, polarization entangled-photon source that includes electrodes for applying a voltage across a waveguide and represents an embodiment of the present invention.

In an alternate embodiment of the present invention, the phase difference $\theta$ acquired by the signal and idler photons in the entangled-photon state $|\phi\rangle$ can be adjusted by applying a voltage across one of the waveguides 1314 and 1316. FIG. 14 illustrates a schematic plan view of a sixth single crystal, polarization entangled-photon source 1400 that includes electrodes for applying a voltage across a waveguide and represents an embodiment of the present invention. The entangled-photon source 1400 is identical to the entangled-photons source 1300, shown in FIG. 13, except for the electrodes 1402 and 1404 located on opposite sides of the waveguide 1316. In the interest of brevity, structurally identical components in both of the entangle-state sources 1300 and 1400 have been provided with the same reference numerals and an explanation of their structure and function is not repeated. The voltage applied across the waveguide 1314 can be tuned as describe above with reference to FIG. 10 to induce a phase adjustment in the photons in the entangled-photon state $|\phi\rangle$ in order to output the polarized photons in the polarization entangled-photon Bell states $|\phi^+\rangle$and $|\phi^-\rangle$.

Figure 15:
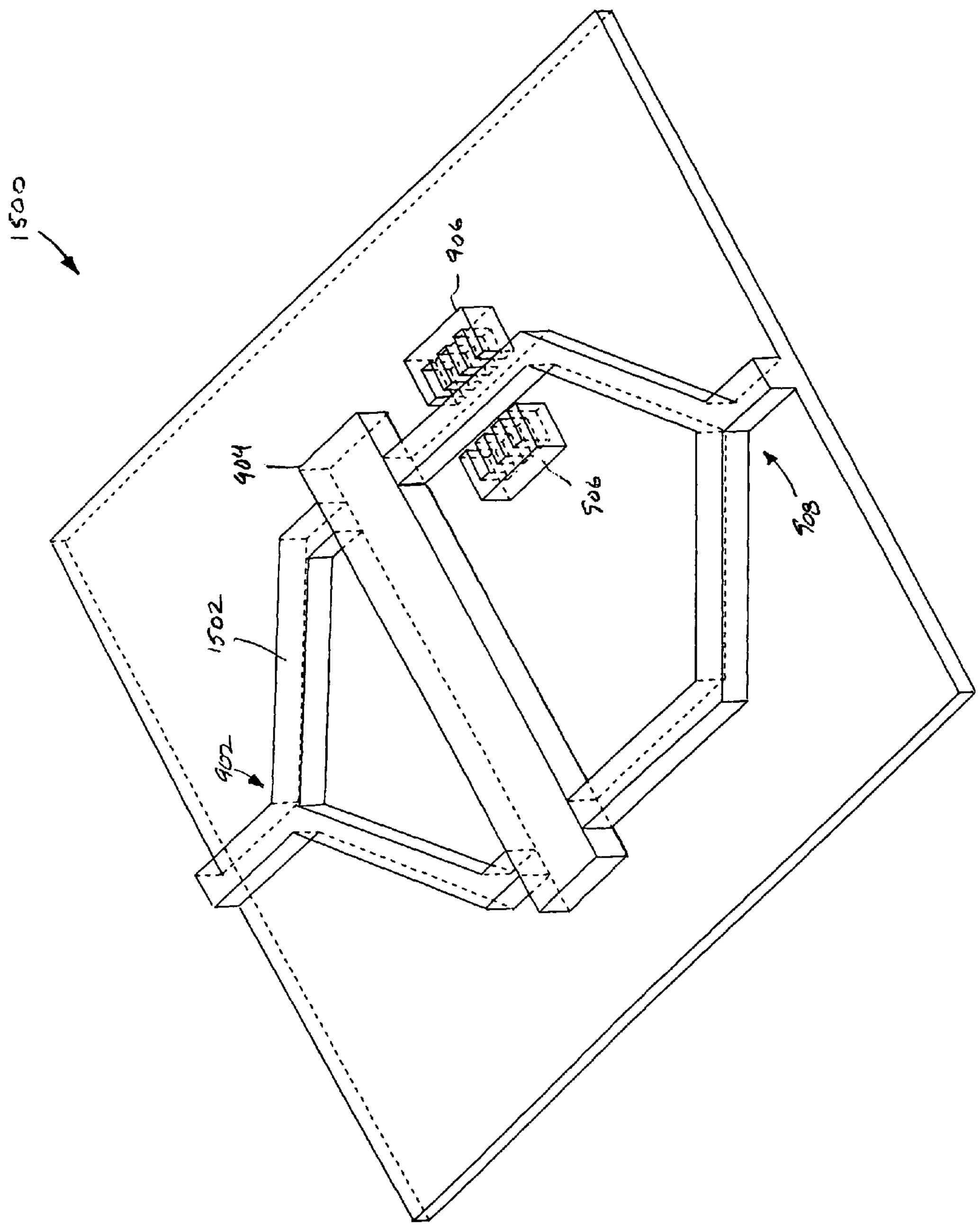
FIG. 15 illustrates an example of a single crystal, polarization entangled-photon source with ridge waveguides that represents an embodiment of the present invention.
Figure 16:
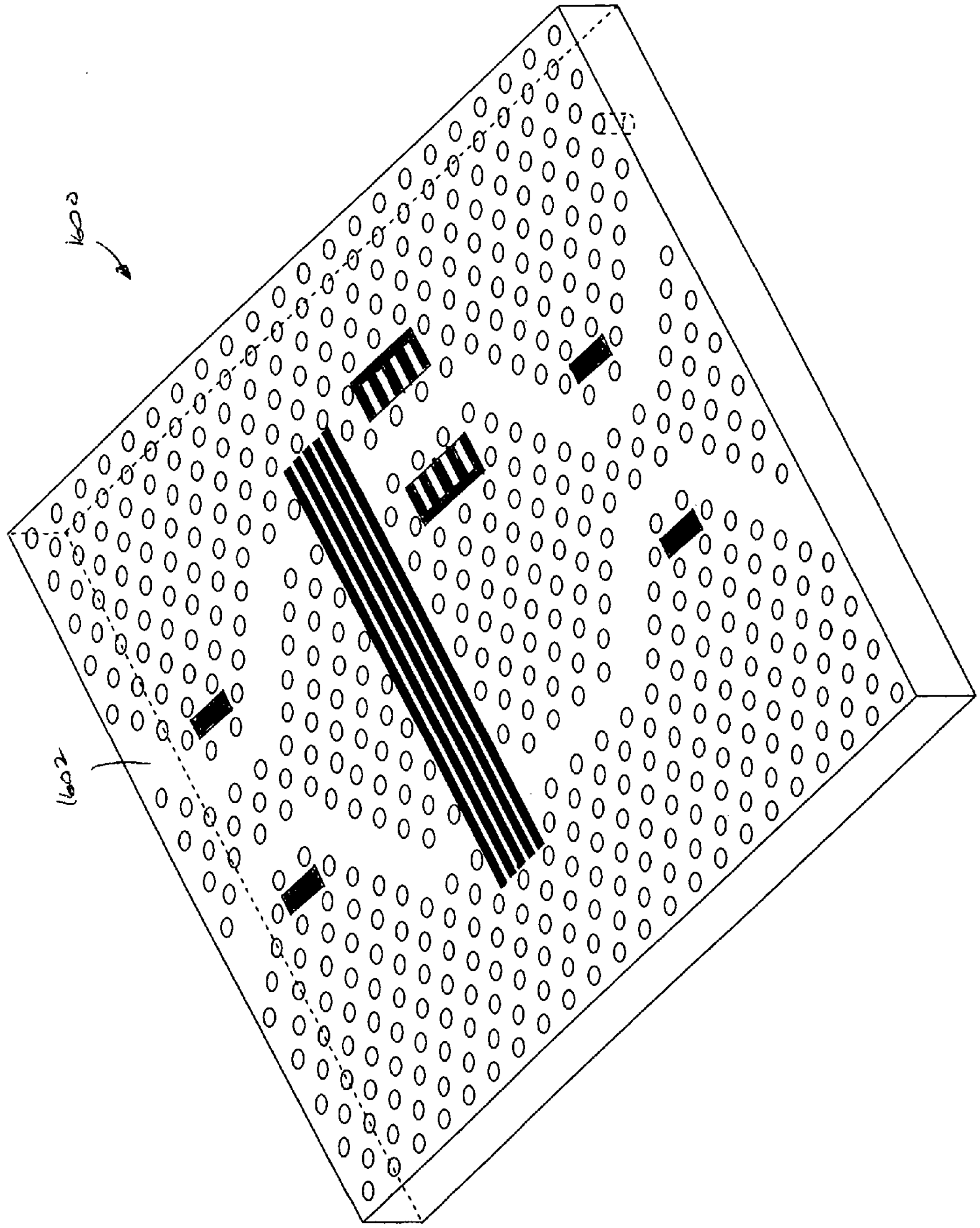
FIG. 16 illustrates an example of single photonic-crystal-based, polarization entangled-photon source that represents an embodiment of the present invention.

Although the present invention has been described in terms of particular embodiments, it is not intended that the invention be limited to these embodiments. Modifications within the spirit of the invention will be apparent to those skilled in the art. In alternate embodiments of the present invention, the transmission layers 912, 1112, and 1312 can be thin-film nonlinear crystals or, thin-film electrooptic polymers. In alternate embodiments of the present invention, additional electrodes can be used to compensate for fabrication inaccuracies, such as phase shifts or coupling ratios. In alternate embodiments of the present invention, additional waveguide elements can be added to either combine or separate the signal and idler beams onto the same or different waveguides. In an alternate embodiment of the present invention, the transmission layer 912 can be lithium niobate, and the Type I DCCs can be a periodically poled lithium niobate doped with magnesium oxide ("MgO") and having a poling period of about 7.73 μm. The pump beam can have a wavelength of about 532 nm, and the entangled-photon source 900 outputs signal and idler photons with wavelengths of 810 nm and 1550 nm. In an alternate embodiment of the present invention, the transmission layer 1112 can be lithium niobate, and the Type II DCCs 1104 and 1106 can be a periodically poled lithium niobate doped with magnesium oxide with a poling period of about 19.48 nm. Inputting a horizontally polarized pump beam with a wavelength of about 780 nm produces degenerate signal and idler photons both with a wavelength of about 1560 nm. In an alternate embodiment of the present invention, the transmission layer 1112 can be KTP, and the Type II DCCs 1104 and 1106 can be a periodically poled KTP ("PPKTP") with a poling period of about 7.85 μm. Inputting a horizontally polarized pump beam with a wavelength of about 380 nm produces degenerate signal and idler photons both with a wavelength of about 780 nm. In an alternate embodiment of the present invention, the nonlinear crystal can be KTP, and the Type II DCCs 1104 can be a PPKTP crystal with a poling period of about 60 nm. Inputting a horizontally polarized pump beam with a wavelength of about 655 nm produces degenerate signal and idler photons both with a wavelength of about 1310 nm. In alternate embodiments of the present invention, the entangled-photon state sources 900, 1000, 1100, 1200, 1300, and 1400 can be implemented using a nonlinear crystal or electrooptic polymer with ridge waveguides. FIG. 15 illustrates an example of a single crystal, polarization entangled-photon source 1500 with ridge waveguides that represents an embodiment of the present invention. In FIG. 15, the entangled-photon source 1500 includes identical components to that of the entangled-photon source 900. The ridge waveguides, such as ridge waveguide 1502, can be etched into the transmission layer or doped with protons or infused with atoms that increase the waveguide refractive index. In alternate embodiments of the present invention, the entangled-photon state sources 900, 1000, 1100, 1200, 1300, 1400 can be implemented in photonic crystals. FIG. 16 illustrates an example of single photonic crystal, polarization entangled-photon source 1600 that represents an embodiment of the present invention. In FIG. 16, the waveguides, such as waveguide 1602, are formed by modifying the photonic crystal geometry, such as removing holes or fabricating holes with different spacing or dimensions. The entangled-photon source 1600 includes identical components to that of the entangled-photon source 1300. In alternate embodiments of the present invention, the 50:50 BSs 902 and 1102 can be replaced with asymmetrical BSs that split the pump beams unevenly, or the BS 1302 can be tuned to split the pump beams unevenly. For example, the horizontally polarized pump beams described above can be output from a BS in a coherent linear superposition of states:

$$\alpha|\alpha_H\rangle_{1p}+\beta|\alpha_H\rangle_{2p}$$

where $\alpha$ and $\beta$ are complex valued amplitudes satisfying the conditions:

$$|\alpha|^2+|\beta|^2=1, \text{ and}$$

$$|\alpha|^2\neq|\beta|^2$$

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A polarization entangled-photon state source comprising:

a single transmission layer configured for transmitting electromagnetic radiation;

a beamsplitter embedded in the transmission layer configured to receive a pump beam and output a first pump beam and a second pump beam;

a down-conversion device embedded in the transmission layer and configured to receive the first pump beam and output both a first signal beam and a first idler beam and receive the second pump beam and output a second signal beam and a second idler beam;

a mode converter embedded in the transmission layer configured to convert electric field components of both the first signal beam and the first idler beam into magnetic field components and convert magnetic field components of both the first signal beam and the first idler beam into electric field components; and a combiner embedded in the transmission layer configured to receive the first and second signal beams and the first and second idler beams and output the first and second signal beams and the first and second idler beams in an entangled state.

2. The source of claim 1 wherein the nonlinear crystal further comprises z-cut nonlinear crystal comprising one of:

$LiNbO_3$;

KTP;

KAP;

β-BBO; and an electrooptic polymer.

3. The source of claim 1 wherein the beamsplitter further comprises one of:

a Y-shaped beamsplitter; and a electronically tunable beamsplitter.

4. The source of claim 1 wherein the down-conversion device further comprises:

a first down-conversion crystal configured to receive the first pump beam and output both the first signal beam and the first idler beam; and a second down-conversion crystal configured to receive the second pump beam and output both the second signal beam and the second idler beam.

5. The source of claim 4 wherein both the first and second down-conversion crystals are either Type I down-conversion crystals or Type II down-conversion crystals.

6. The source of claim 1 wherein the down-conversion device further comprises a single down-conversion crystal configured to receive the first pump beam and output both the first signal beam and the first idler beam and to receive the second pump beam and output both the second signal beam and the second idler beam.

7. The source of claim 6 wherein the single down-conversion crystal further comprises one of:

a Type I down-conversion crystal; and a Type II down-conversion crystal.

8. The source of claim 1 wherein the mode converter further comprises a waveguide located between a first electrode and a second electrode.

9. The source of claim 1 wherein the combiner further comprises one of:

a Y-shaped junction combiner; and an electronically tunable polarization combiner.

10. The source of claim 1 wherein the transmission layer further comprises one of:

a photonic crystal with waveguides;

a nonlinear crystal with ridge waveguides; and a nonlinear crystal substrate with strip waveguides.

11. The source of claim 10 wherein the waveguides are configured to transmit electromagnetic radiation between components of the entangled-photon state source.

12. The source of claim 10 wherein the waveguides of a $LiNbO_3$ crystal have either been infused with Ti or doped with protons.

13. The source of claim 1 further comprises a waveguide sandwiched between two electrodes that are configured to apply a voltage across the waveguide in order to provide a phase adjustment.

14. A method of generating polarization entangled-photon states, the method comprising:

splitting a pump beam into a first pump beam and a second pump beam;

down converting the first pump beam into a first signal beam and a first idler beam and the second pump beam into a second signal beam and a second idler beam;

converting electric field components of both the first signal beam and the first idler beam into magnetic field components and magnetic field components of both the first signal beam and the first idler beam into electric field components; and combining the first and second signal beams with the first and second idler beams in order to obtain the first and second signal beams and the first and second idler beams in an entangled state.

15. The method of claim 14 wherein splitting the pump beam into a first pump beam and a second pump beam further comprises transmitting the pump beam through beamsplitter.

16. The method of claim 14 wherein down converting the first pump beam and the second pump beam further comprises transmitting the first pump beam and the second pump beam through a down-conversion crystal.

17. The method of claim 16 wherein the down-conversion crystal further comprises one of:

a Type I down-conversion crystal; and a Type II down-conversion crystal.

18. The method of claim 14 wherein both the first and second signal and idler beams are in a first polarization state, or the first and second signal beams are in a first polarization state and the first and second idler beams are in a second polarization state.

19. The method of claim 14 wherein converting electric field components into magnetic field components and magnetic field components into electric field components further comprises transmitting the first signal beam and first idler beam through a mode converter.

20. The method of claim 14 wherein combining the first and second idler beams and the first and second signal beams further comprises transmitting the first and second idler beams and the first and second signal beams through a polarization combiner.

* * * * *

UNITED STATES PATENT AND TRADEMARK OFFICE

CERTIFICATE OF CORRECTION

PATENT NO. : 7,373,059 B2

APPLICATION NO. : 11/525717
DATED : May 13, 2008
INVENTOR(S) : Sean Spillane et al.

It is certified that error appears in the above-identified patent and that said Letters Patent is hereby corrected as shown below:

In column 3, line 55, delete " $|0>_1$ " and insert -- $|0\rangle_1$ --, therefor.

In column 13, line 30, delete " $|\beta\rangle = \frac{1}{2}(|\alpha_H\rangle_{1p} + |\alpha_H\rangle_{2p})$ " and insert -- $|\beta\rangle = \frac{1}{\sqrt{2}}\left(|\alpha_H\rangle_{1p} + |\alpha_H\rangle_{2p}\right)$ --, therefor.

In column 13, line 35, delete " $|\alpha_H\rangle_p$ " and insert -- $|\alpha_H\rangle_{1p}$ --, therefor.

In column 15, line 64, delete " $|\alpha_H>_{2p}$ " and insert -- $|\alpha_H\rangle_{2p}$ --, therefor.

Signed and Sealed this

Fourteenth Day of July, 2009

JOHN DOLL
*Acting Director of the United States Patent and Trademark Office*